United States Patent
Tonomura et al.

(10) Patent No.: US 10,862,083 B2
(45) Date of Patent: Dec. 8, 2020

(54) BATTERY UNIT, BATTERY MODULE, POWER STORAGE SYSTEM, ELECTRONIC DEVICE, ELECTRIC POWER SYSTEM, AND ELECTRIC VEHICLE

(75) Inventors: Yasuhiro Tonomura, Fukushima (JP);
Ryo Tanabe, Fukushima (JP);
Munenori Inden, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 523 days.

(21) Appl. No.: 13/474,188

(22) Filed: May 17, 2012

(65) Prior Publication Data
US 2012/0301763 A1  Nov. 29, 2012

(30) Foreign Application Priority Data

May 27, 2011  (JP) .................................. 2011-119687
Jan. 6, 2012  (JP) .................................. 2012-001229

(51) Int. Cl.
*H01M 2/10* (2006.01)
*H01M 2/20* (2006.01)
(Continued)

(52) U.S. Cl.
CPC ........... *H01M 2/1066* (2013.01); *H01M 2/06* (2013.01); *H01M 10/625* (2015.04);
(Continued)

(58) Field of Classification Search
CPC ... H01M 10/5053; H01M 2/06; H01M 2/1066
(Continued)

(56) References Cited

U.S. PATENT DOCUMENTS 5,767,658 A * 6/1998 Hayes .................... H02J 7/1423
320/104
6,275,003 B1 * 8/2001 Marukawa .......... H01M 2/0245
320/107
(Continued)

FOREIGN PATENT DOCUMENTS

CN  1842929 A  10/2006
CN  1988215 A  6/2007
(Continued)

OTHER PUBLICATIONS

Office Action for CN Patent Application No. 201610956964.2, dated Jan. 28, 2019, 11 pages of Office Action and 13 pages of English Translation.
(Continued)

*Primary Examiner* — Sarah A. Slifka
*Assistant Examiner* — Brent C Thomas
(74) *Attorney, Agent, or Firm* — Chip Law Group

(57) ABSTRACT

A battery unit includes a box-shaped case in which a plurality of secondary batteries are stored and that includes a front face, a back face, a first lateral face, a second lateral face, a first main face, and a second main face, a first heat-transfer face that is provided on one faces of the first and second main faces of the case, a second heat-transfer face that is formed on at least one faces of the first and second lateral faces and is continued to the first heat-transfer face, and an insulating face that is formed on the front face, the back face, the other faces of the first and second main faces, and an inner face of the second heat-transfer face. In the battery unit, a battery element of the secondary batteries is stored in an outer package member and positive and negative electrode tabs are led out.

15 Claims, 21 Drawing Sheets

(51) Int. Cl.
  *H02J 7/00* (2006.01)
  *H01M 2/06* (2006.01)
  *H01M 10/647* (2014.01)
  *H01M 10/6554* (2014.01)
  *H01M 10/625* (2014.01)

(52) U.S. Cl.
  CPC ..... *H01M 10/647* (2015.04); *H01M 10/6554* (2015.04); *H01M 2220/20* (2013.01)

(58) Field of Classification Search
  USPC .......................................................... 429/99
  See application file for complete search history.

(56) References Cited

U.S. PATENT DOCUMENTS

| | | | | |
|---|---|---|---|---|
| 2002/0010998 | A1* | 1/2002 | Komatsu | H01M 2/021 29/623.2 |
| 2003/0017384 | A1* | 1/2003 | Marukawa et al. | 429/120 |
| 2004/0021446 | A1* | 2/2004 | Bang | G06F 1/30 320/166 |
| 2004/0152365 | A1* | 8/2004 | Ebine | 439/701 |
| 2005/0017678 | A1* | 1/2005 | Hiratsuka | H01M 2/0215 320/112 |
| 2005/0156574 | A1* | 7/2005 | Sato | H02H 7/18 320/134 |
| 2005/0238955 | A1* | 10/2005 | Hooke | H01M 2/0434 429/181 |
| 2006/0246350 | A1* | 11/2006 | Takayama | B60L 3/0046 429/178 |
| 2007/0141457 | A1* | 6/2007 | Amagai | H01M 2/021 429/152 |
| 2010/0076615 | A1* | 3/2010 | Daniel et al. | 700/293 |
| 2010/0209760 | A1 | 8/2010 | Yoshihara et al. | |
| 2011/0162820 | A1* | 7/2011 | Weber | H01M 10/052 165/104.28 |
| 2011/0305935 | A1* | 12/2011 | Yoon | B60L 11/1879 429/120 |
| 2012/0040226 | A1* | 2/2012 | Kim | H01M 2/1077 429/120 |

FOREIGN PATENT DOCUMENTS

| | | |
|---|---|---|
| CN | 101630754 A | 1/2010 |
| JP | 2000-173559 | 6/2000 |
| JP | 2007-134308 | 5/2007 |
| JP | 2010-010460 A | 1/2010 |

OTHER PUBLICATIONS

Office Action for CN Patent Application No. 201610956964.2, dated Nov. 4, 2019, 14 pages of Office Action and 14 pages of English Translation.

Office Action for CN Patent Application No. 201610956964.2, dated Jun. 3, 2020, 08 pages of Office Action and 14 pages of English Translation.

* cited by examiner

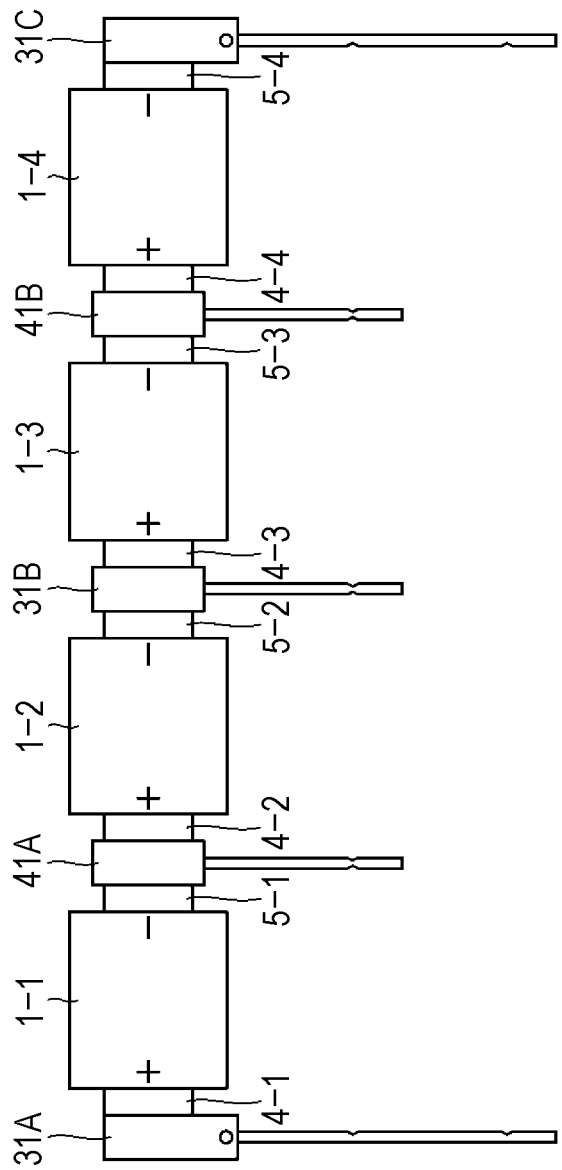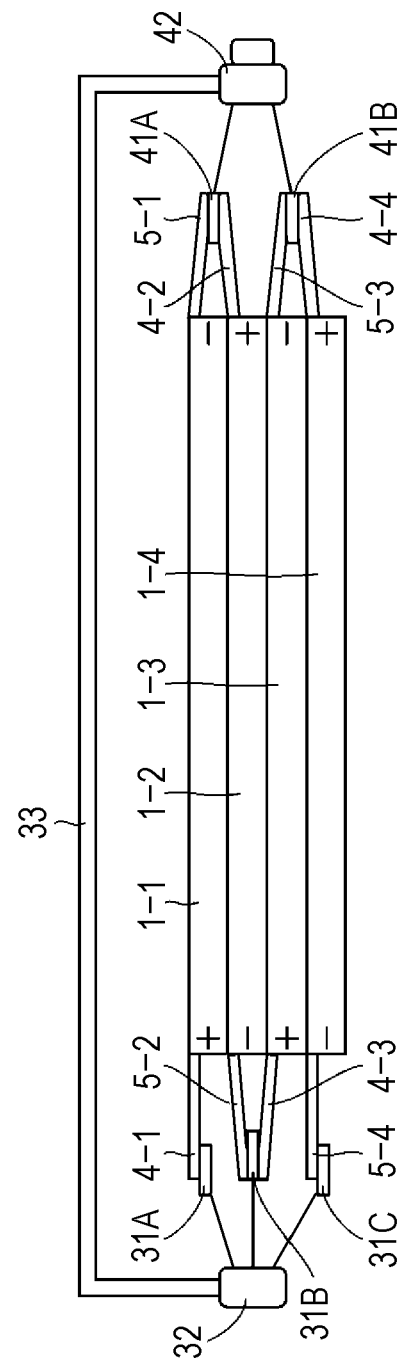

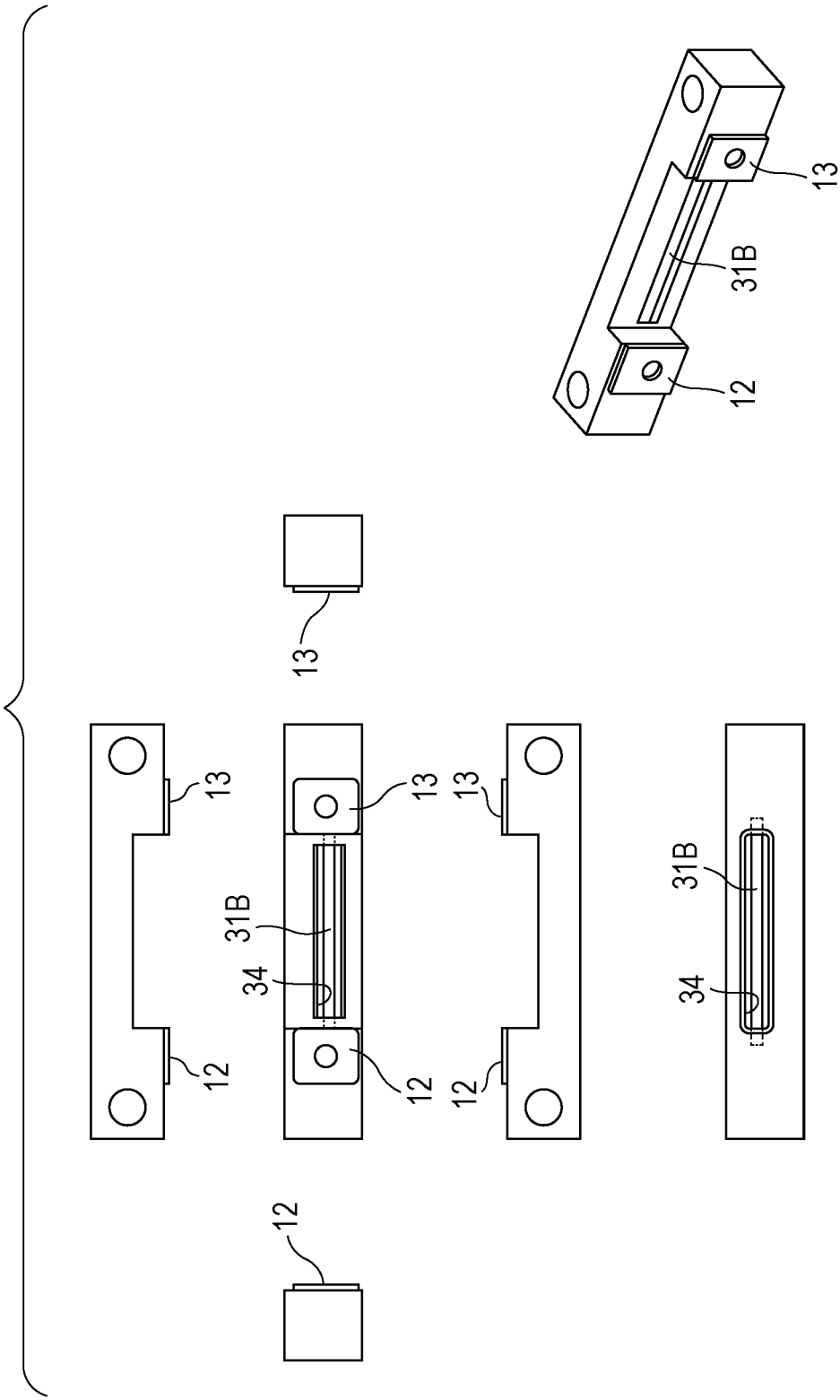

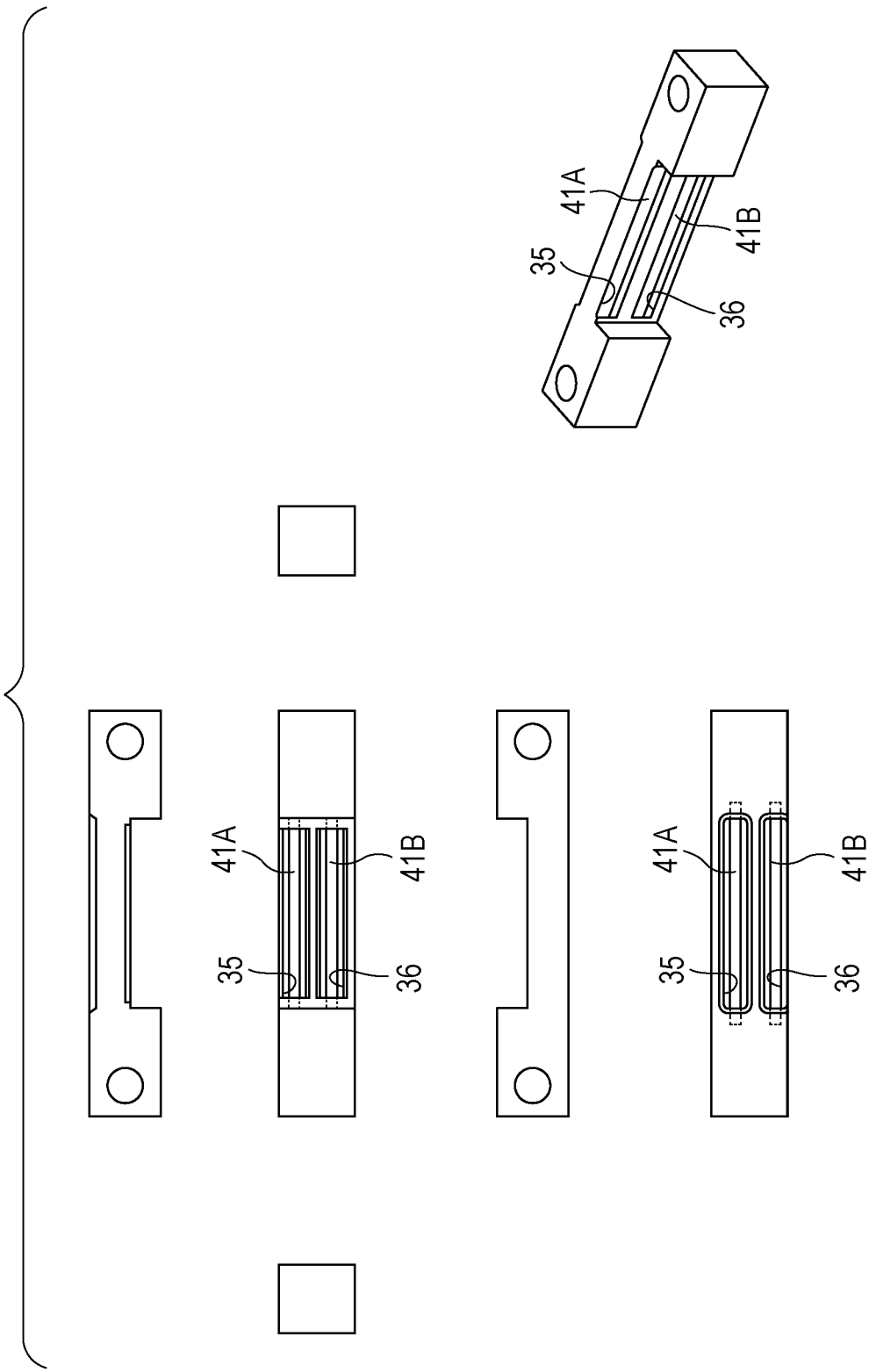

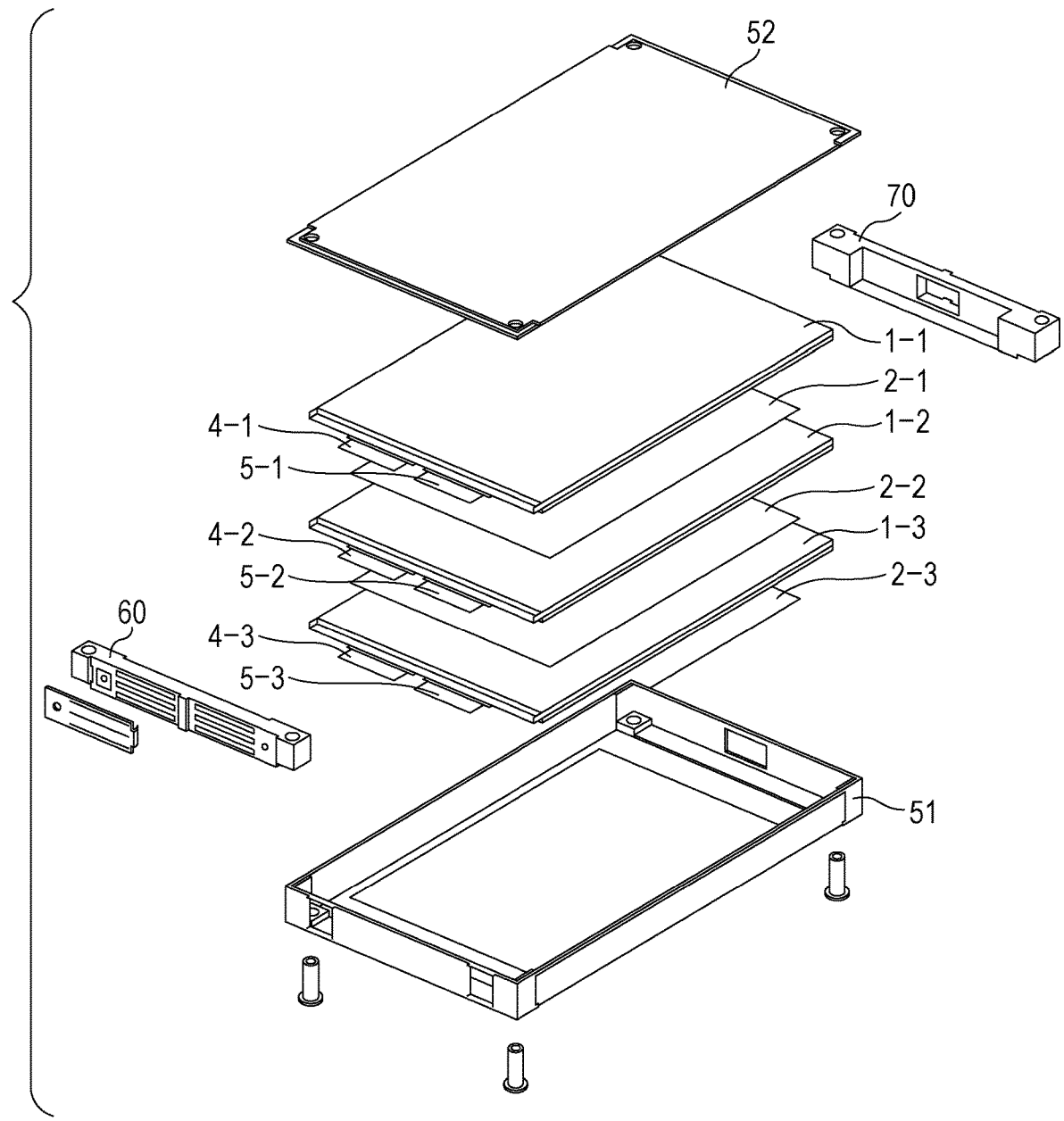

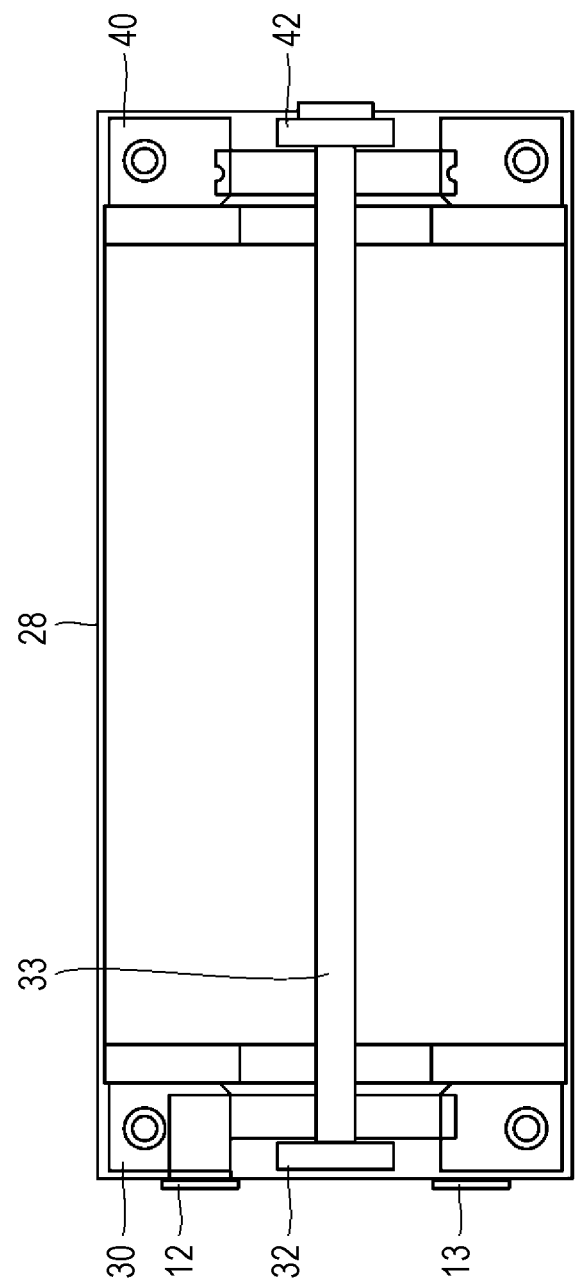

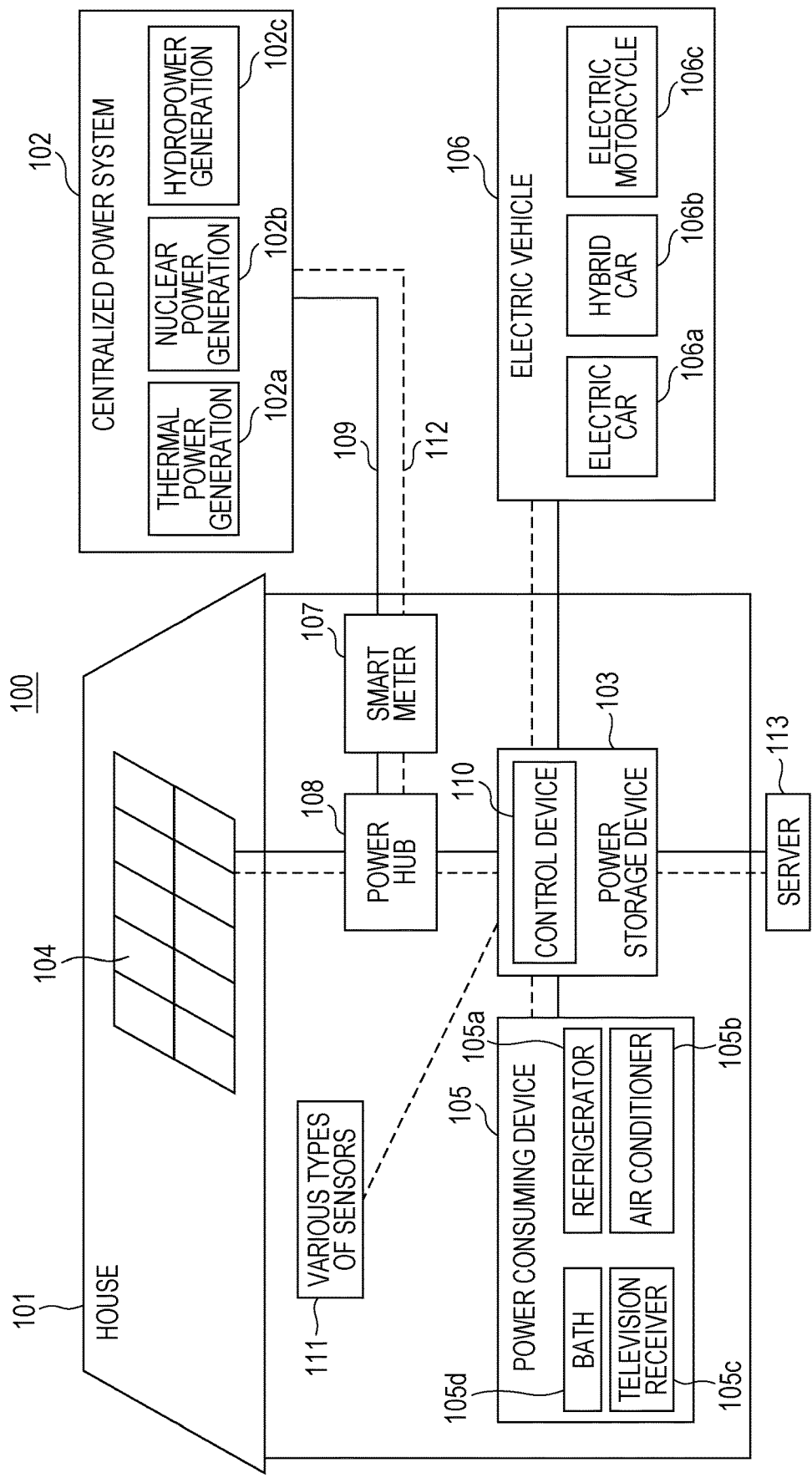

BATTERY UNIT, BATTERY MODULE, POWER STORAGE SYSTEM, ELECTRONIC DEVICE, ELECTRIC POWER SYSTEM, AND ELECTRIC VEHICLE

CROSS REFERENCES TO RELATED APPLICATIONS

The present application claims priority to Japanese Patent Application JP 2011-119687 filed in the Japan Patent Office on May 27, 2011, and Japanese Patent Application JP 2012-001229 filed in the Japan Patent Office on Jan. 6, 2012, the entire contents of which are hereby incorporated by reference.

BACKGROUND

The present disclosure relates to a battery unit, a battery module, a power storage system, an electronic device, an electric power system, and an electric vehicle.

A lithium ion secondary battery in which carbon is used for a negative electrode, a lithium transition metal composite oxide is used for a positive electrode, and a mixture of carbonate ester is used for an electrolyte has been widespread. In a lithium ion secondary battery having such configuration, oxidation and reduction of carbonate ester with respect to water or other organic solvent are stable, being able to obtain higher voltage. Accordingly, the lithium ion secondary battery has larger energy density and higher capacity than a nickel hydride battery which is an aqueous battery. Therefore, the lithium ion secondary battery has been widely used as a secondary battery of an electric power tool, a notebook computer, a portable telephone, a video camera, and a digital still camera.

In recent years, a lithium ion secondary battery has begun to be widespread to industrial application such as an electric car and power storage other than the above-described use. In a case of a secondary battery for industrial application, battery performance of high capacity, high output, and long life is demanded. One of battery performances resistant against a large current is a heat dissipation property. When a large current is supplied, a battery generates heat. However, excessive rise of a battery temperature promotes degradation of battery performance and shortens battery life. Therefore, how to efficiently dissipate generated heat of a battery is important and various studies are conducted.

As a technique to improve a heat dissipation property of a battery, a method for sticking a film having a high heat dissipation property and a technique to improve a heat dissipation property by covering by a black covering member are disclosed (refer to Japanese Unexamined Patent Application Publication No. 2000-173559 and Japanese Unexamined Patent Application Publication No. 2007-134308). However, in this technique, the number of elements other than the battery is increased and therefore the cost is increased. Further, volume energy density of the elements is decreased disadvantageously.

SUMMARY

Therefore, it is preferable to obtain an excellent heat dissipation property without increasing the number of elements. Commonly, a surface of a battery is covered by an insulating outer package member. In the use of a large output of a vehicle or the like, a battery unit in which many batteries are combined (referred to as a battery pack, as well) is used. For example, when many batteries in which a resin molded product is used as an outer package member are combined, a volume occupied by the outer package member becomes large, causing degradation of volume energy density.

On the other hand, a battery in which a thin laminate film is used as an outer package member is widespread. This type of battery has such advantage that volume energy density can be increased. However, when a battery unit is configured by this type of batteries, the laminate film may be damaged by shaking or the like so as to cause short circuit.

It is desirable to provide a battery unit, an electronic device, an electric power system, and an electric vehicle which have an excellent heat dissipation property without causing increase of the number of elements.

A battery unit according to an embodiment of the present disclosure includes a box-shaped case in which a plurality of secondary batteries are stored and that includes a front face, a back face, a first lateral face, a second lateral face, a first main face, and a second main face, a first heat-transfer face that is provided on one faces of the first and second main faces of the case, a second heat-transfer face that is formed on at least one faces of the first and second lateral faces and is continued to the first heat-transfer face, and an insulating face that is formed on the front face, the back face, the other faces of the first and second main faces, and an inner face of the second heat-transfer face. In the battery unit, a battery element of the secondary batteries is stored in an outer package member and positive and negative electrode tabs are led out.

It is preferable that the first and second heat-transfer faces and the insulating face of the case be integrally formed.

A battery module according to another embodiment of the present disclosure includes at least two above-described battery units that are layered to be opposed to each other and have a gap therebetween.

In a power storage system according to still another embodiment of the present disclosure, the above-described battery unit is charged by a power generation device that generates power from renewable energy.

A power storage system according to yet another embodiment of the present disclosure includes the above-described battery unit and supplies power to an electronic device that is connected with the battery unit.

An electronic device according to yet another embodiment of the present disclosure is supplied with power from the above-described battery unit.

An electric vehicle according to yet another embodiment of the present disclosure includes a conversion device configured to receive electric power supply from the above-described battery unit so as to convert the electric power into driving force of the vehicle, and a control device configured to perform information processing about vehicle control based on information about the battery unit.

An electric power system according to yet another embodiment of the present disclosure includes a power information transmission/reception unit configured to transmit/receive a signal to/from other device via a network, and performs charging/discharging control of the above-described battery unit, based on information that is received by the power information transmission/reception unit.

An electric power system according to yet another embodiment of the present disclosure receives power supply from the above-described battery unit or supplies power to the battery unit from an electric generation device or a power network.

According to the embodiments of the present disclosure, the first and second heat-transfer faces and the insulating face are integrally formed in the case. Therefore, compared to a case where a case, a heat-transfer face, and an insulating face are separately formed, the number of elements can be reduced and volume energy density can be improved.

Additional features and advantages are described herein, and will be apparent from the following Detailed Description and the figures.

BRIEF DESCRIPTION OF THE FIGURES

FIGS. 8A and 8B are a connection diagram illustrating series connection of secondary batteries;

FIG. 9 illustrates one side holder;

FIG. 10 illustrates the other side holder;

FIG. 12 is an exploded perspective view illustrating a battery unit of parallel connection;

FIG. 16 illustrates wiring for detecting voltage of each secondary battery;

FIG. 21 is a schematic diagram illustrating an application example of a battery pack.

DETAILED DESCRIPTION

Hereinafter, embodiments of the present application will be described with reference to drawings.
[Configuration of Battery Unit]

Figure 1:
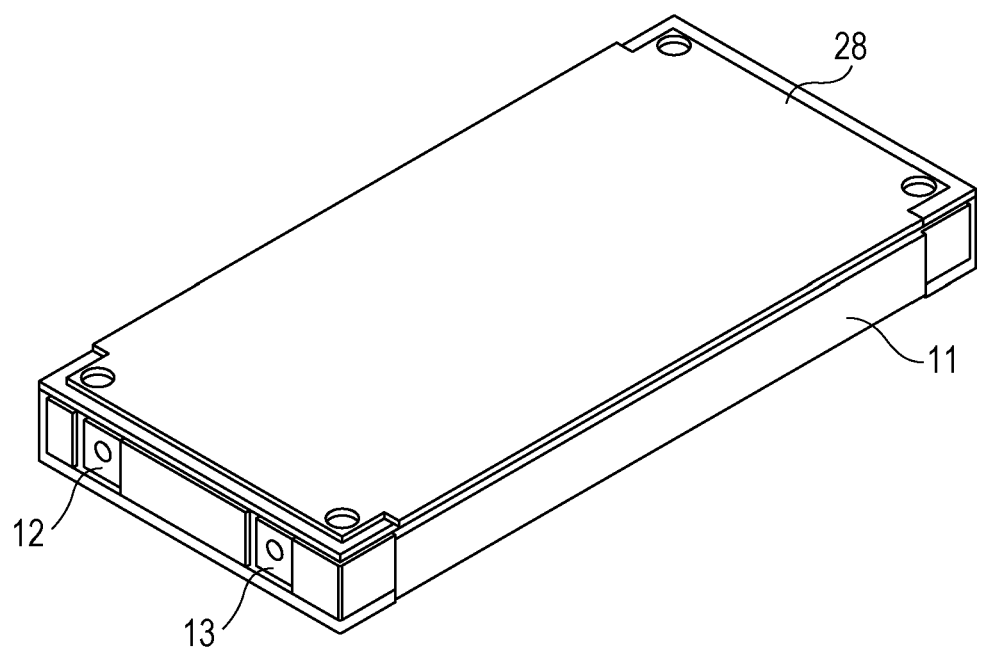
FIG. 1 is a perspective view illustrating an outer appearance of a battery unit according to an embodiment of the present disclosure.
Figure 2:
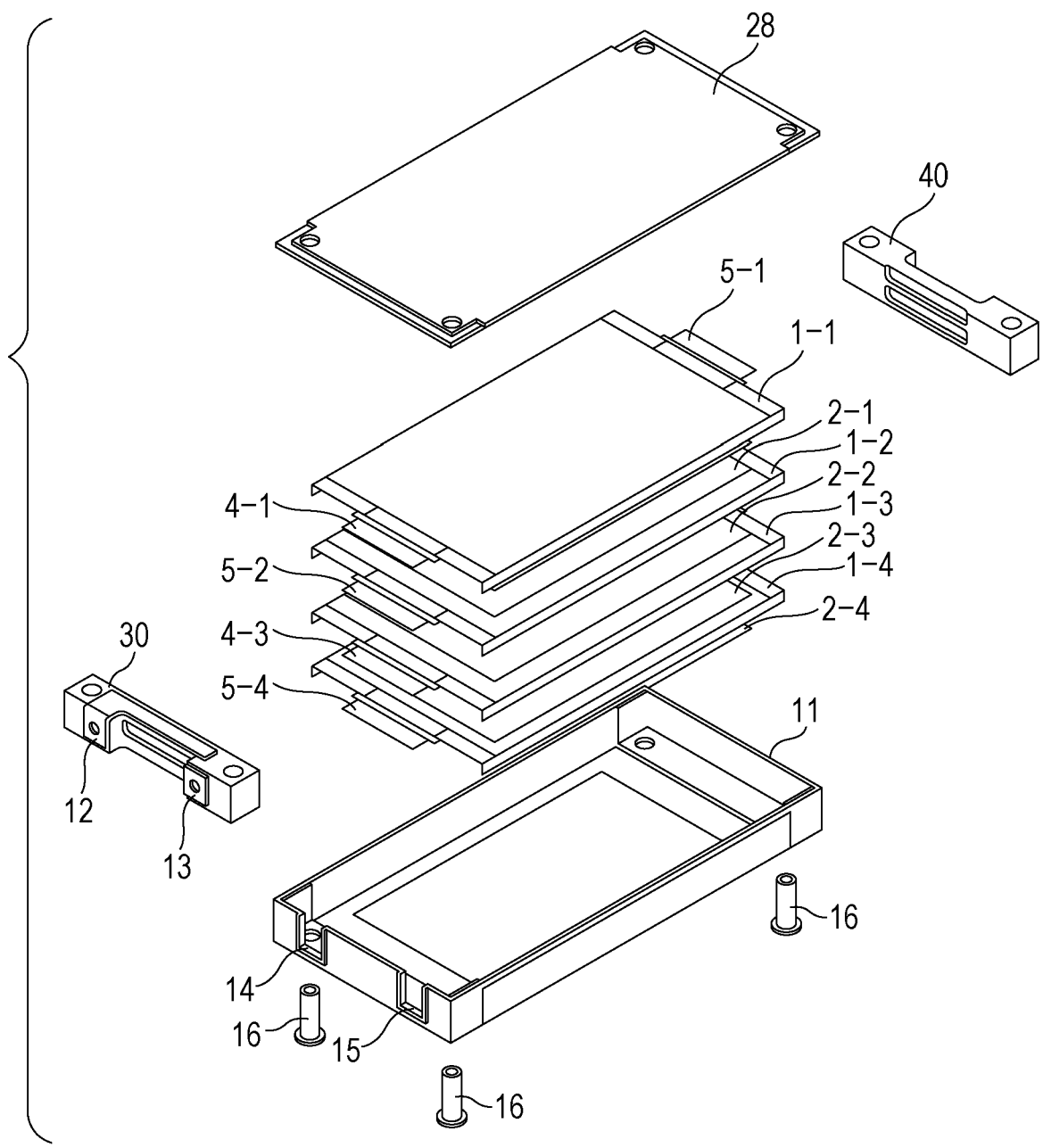
FIG. 2 is an exploded perspective view of the battery unit according to the embodiment of the present disclosure.

A battery unit according to an embodiment of the present disclosure is described below. FIGS. 1 and 2 are respectively a perspective view and an exploded perspective view of a battery unit 10 according to the present disclosure. A case of the battery unit 10 has a box shape and is composed of a bottom case 11 and a top cover 28. That is, the case includes a front face, a back face, a first lateral face, a second lateral face, a first main face (a bottom face of the bottom case 11) and a second main face (the top cover 28).

In a state that the top cover 28 is removed, four pieces of secondary batteries 1-1, 1-2, 1-3, and 1-4 having a rectangular plate shape, for example, are stored with thermal conductive sheets 2-1, 2-2, 2-3, and 2-4 respectively interposed, in the bottom case 11 having the boxed shape. The width of a storing portion of the bottom case 11 is slightly larger than the widths of the secondary batteries 1-1 to 1-4, and inner faces of both lateral walls of the storing portion of the bottom case 11 are highly close to or brought into contact with the lateral faces on both sides of the secondary batteries 1-1 to 1-4. Here, the number of secondary batteries is not limited to four but arbitrary number equal to or more than two may be selected.

The secondary batteries 1-1 to 1-4 have the layered electrode configuration in which positive electrodes that have an approximate rectangular plate shape and negative electrodes that are arranged opposed to the positive electrodes and have an approximate rectangular shape are alternately layered with separators interposed, as described later. Surfaces of the secondary batteries 1-1 to 1-4 are covered by an outer package member. Positive electrode tabs 4-1, 4-2, 4-3, and 4-4 and negative electrode tabs 5-1, 5-2, 5-3, and 5-4 are led from respective opposed short sides of the secondary batteries 1-1 to 1-4. The four pieces of secondary batteries 1-1 to 1-4 are connected in series in this example, so that the positive electrode tabs and the negative electrode tabs are alternately positioned in a layered manner.

The thermal conductive sheets 2-1 to 2-4 are double-faced adhesive tapes having excellent thermal conductivity, for example. Thanks to the thermal conductive sheets 2-1 to 2-4, adjacent secondary batteries are thermally favorably joined with each other and positions of the secondary batteries 1-1 to 1-4 in the case are fixed.

Further, a first side holder 30 and a second side holder 40 are inserted into the bottom case 11. The side holders 30 and 40 include bus bars which serve as conductive portions, in an integrated manner by insert-molding. Insert-molding is a molding method in which after an insertion product (a bus bar in this example) which is an embedded object is fitted in a mold, resin is charged into a molding machine so as to wrap the insertion product by molten resin and solidify the insertion product and thus the resin and the insertion product are integrated.

The bus bar is a plate-shaped conductor which is formed by plating copper with nickel, for example, and is insulated by resin. The side holder 30 has a function to collect the tabs of the secondary batteries 1-1 to 1-4 by the bus bar and to lead a terminal to the outside. The side holder 40 has a function to collect the tabs of the secondary batteries 1-1 to 1-4 by the bus bar.

On faces, which do not face the secondary batteries 1-1 to 1-4, of the side holder 30, angle nuts 12 and 13 are fixed. One of the angle nuts is a positive electrode terminal and the other is a negative electrode terminal. These angle nuts 12 and 13 are exposed respectively through two cutouts 14 and 15 which are formed on the front face of the bottom case 11 and are used for connection of the battery unit outside the case. The angular nuts 12 and 13 may be molded to be integrated with the side holder by insert molding.

Circular holes are formed on four corner portions of the bottom case 11, similar circular holes are formed on corresponding four positions of the top cover 28, and further, circular holes are formed on the side holders 30 and 40 on positions which correspond to the circular holes of the bottom case 11 and the top cover 28 when the side holders 30 and 40 are disposed in the case. In a state that the secondary batteries 1-1 to 1-4 which are connected with the bus bars of the side holders 30 and 40 respectively are stored in the bottom case 11, sleeve holders 16 are fitted in the circular holes. The sleeve holders 16 are made of metal.

In assembling of the battery unit, four pieces of secondary batteries 1-1 to 1-4 are layered with the thermal conductive sheets 2-1 to 2-4 interposed. The tabs led out from the both sides of the secondary batteries 1-1 to 1-4 are connected with the bus bars of the side holders 30 and 40. As an example, the tabs and the bus bars are welded by laser welding. The laser welding is welding in which a welding part is heated with laser beams. Welding method other than the laser welding may be employed.

The secondary batteries 1-1 to 1-4 which are connected with the side holders 30 and 40 are stored in the bottom case 11. The sleeve holders 16 are fitted in the holes so as to fix a laminated state. Then, an opening on the upper face of the bottom case 11 is closed by the top cover 28. Since an end face of the upper face of the bottom case 11 is made of resin, the top cover 28 can be attached to the bottom case 11 by various methods such as ultrasonic bonding, screwing, adhesion, and fitting.

[Configuration of Secondary Battery]

Figure 3A:
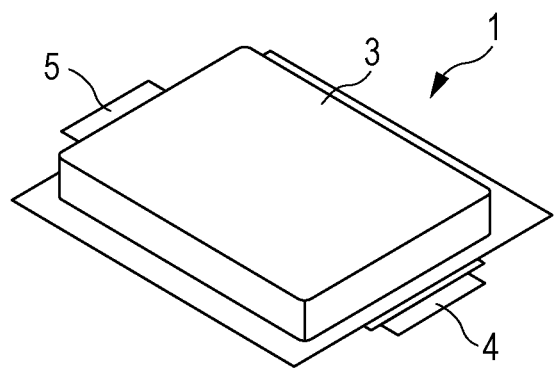
FIGS. 3A to 3D are perspective views illustrating an example of a secondary battery which is applicable to the embodiment of the present disclosure and a partial sectional view of an outer package member.
Figure 3B:
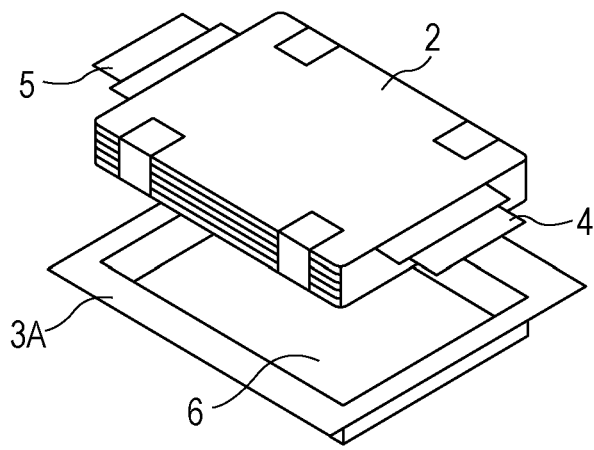
Figure 3C:
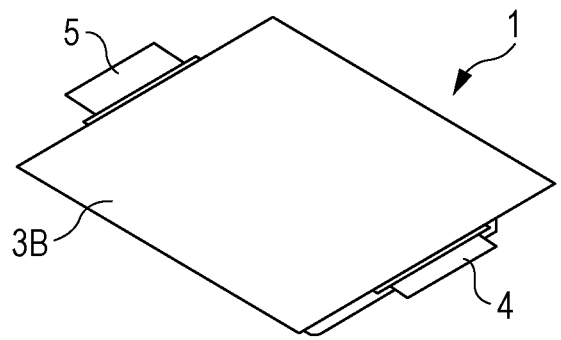

FIG. 3A is a schematic diagram illustrating an outer appearance of a non-aqueous electrolyte battery (arbitrarily referred to below as a secondary battery 1) which is applicable in the embodiment of the present disclosure. FIG. 3B is a schematic diagram illustrating the configuration of the secondary battery 1 (when the secondary batteries 1-1 to 1-4 do not have to be especially discriminated, these batteries are referred to collectively as the secondary battery 1). Here, FIG. 3B illustrates the configuration of a case where the bottom face and the upper face of the secondary battery 1 which is depicted in FIG. 3A are inverted. FIG. 3C is a schematic diagram illustrating a bottom face side of the outer appearance of the secondary battery 1. The secondary battery 1 is a so-called lithium-ion secondary battery and includes a battery element 2 and an outer package member 3 which stores the battery element 2. The secondary battery 1 has a first main face and a second main face.

The outer package member 3 is composed of a first outer packaging portion 3A which stores the battery element 2 and a second outer packaging portion 3B which serves as a lid for covering the battery element 2. It is preferable that the outer package member 3 and the battery element 2 be closely attached with each other. As an example, the thickness of the battery element 2 is approximately from 5 mm to 20 mm. The discharged capacity of the battery element 2 is, for example, in a range of 3 Ah to 50 Ah inclusive.

The battery element 2 has the layered electrode configuration in which positive electrodes which have an approximately rectangular shape and negative electrodes which are disposed to be opposed to the positive electrodes and have an approximately rectangular shape are alternately layered with separators interposed. Further, from the battery element 2, a positive electrode current collector exposing portion which is electrically connected with each of a plurality of positive electrodes and a negative electrode current collector exposing portion which is electrically connected with each of a plurality of negative electrodes are led out. To the positive electrode current collector exposing portion and the negative electrode current collector exposing portion, the positive electrode tabs 4 and the negative electrode tabs 5 are respectively connected. When the positive electrode tabs 4-1 to 4-4 and the negative electrode tabs 5-1 to 5-4 do not have to be especially discriminated, these positive electrode tabs and negative electrode tabs are collectively referred to as the positive electrode tab 4 and the negative electrode tab 5 respectively.

Examples of materials of the positive electrode tab 4 and the negative electrode tab 5 include materials such as nickel (Ni), copper (Cu), aluminum (Al), stainless (SUS), and titanium (Ti), and alloys including phosphorus (P), silver (Ag), tin (Sn), iron (Fe), zirconium (Zr), chrome (Cr), silicon (Si), magnesium (Mg), or nickel (Ni). Among these materials, it is preferable to use copper (Cu), aluminum (Al), and copper (Cu) alloy.

Such the battery element 2 is packaged by the outer package member 3, and the positive electrode tab 4 and the negative electrode tab 5 are led from a sealing portion of the outer package member 3 to the outside of the secondary battery 1. The outer package member 3 has a concave portion 6 which is formed by preliminarily conducting deep drawing on at least one face or both faces thereof, and the battery element 2 is housed in the concave portion 6. In FIG. 3B, the concave portion 6 is formed on the first outer packaging portion 3A constituting the outer package member 3, and the battery element 2 is housed in the concave portion 6.

The second outer packaging portion 3B is disposed to cover the opening of the concave portion 6, and the second outer packaging portion 3B is bonded with a circumference of the opening of the concave portion 6 by thermal fusion or the like, sealing the opening. The positive electrode tab 4 and the negative electrode tab 5 which are respectively connected with the positive electrode current collector and the negative electrode current collector are led out from two opposed directions.

Though it is not illustrated, an adhesion film for preventing entrance of outside air, that is, a sealant may be inserted between the outer package member 3 and the positive electrode tab 4 and between the outer package member 3 and the negative electrode tab 5. The sealant is made of a resin material having excellent adhesiveness with respect to the positive electrode tab 4 and the negative electrode tab 5. Examples of such resin material include modified polymer such as acid-modified polypropylene (PP).

Figure 3D:
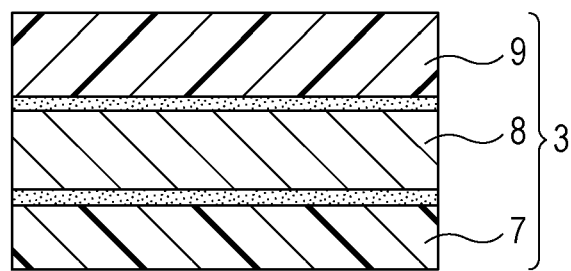

The outer package member 3 is a flexible film, for example. As illustrated in FIG. 3D, the outer package member 3 has the configuration in which a thermal fusion resin layer 7, a metallic layer 8, and a surface protection layer 9 are sequentially layered with adhesive interposed therebetween. Here, a face on a thermal fusion resin layer 7 side is a face on a side on which the battery element 2 is housed. It is preferable that the thermal fusion resin layer 7 closely contact with the surface of the battery element 2. Examples of the material of the thermal fusion resin layer 7 include polypropylene (PP) and polyethylene (PE). The metallic layer 8 is preferably made of metal having flexibility, and examples of the material of the metallic layer 8 include aluminum (Al) and an aluminum alloy. Examples of the material of the surface protection layer 9 include nylon (Ny) and polyethylene terephthalate (PET).

Concretely, the outer package member 3 is composed of a rectangular aluminum laminate film which is obtained by sequentially bonding a polyethylene film, an aluminum foil, and a nylon film in this order, for example. The outer package member 3 is disposed so that the polyethylene film side faces the battery element 2, and an outer edge portion of the outer package member 3 is closely attached with the battery element 2 by fusion bonding or adhesive. Here, the outer package member 3 may be composed of a laminate film having other configuration, a polymer film such as polypropylene, or a metallic film, instead of the above-described aluminum laminate film.

Here, the configuration of the secondary battery which is applicable to the embodiment of the present disclosure is not limited to the above-described configuration. For example, such configuration may be employed that a separator is formed to have a long belt shape and is folded in a winding manner and the positive electrode and the negative electrode are sandwiched between folds of the folded separator so as to be layered. Alternatively, such configuration may be employed that a wound electrode body on which a positive electrode lead and a negative electrode lead are attached is housed inside the outer package member having a film shape.

[Bottom Case]

Figure 4:
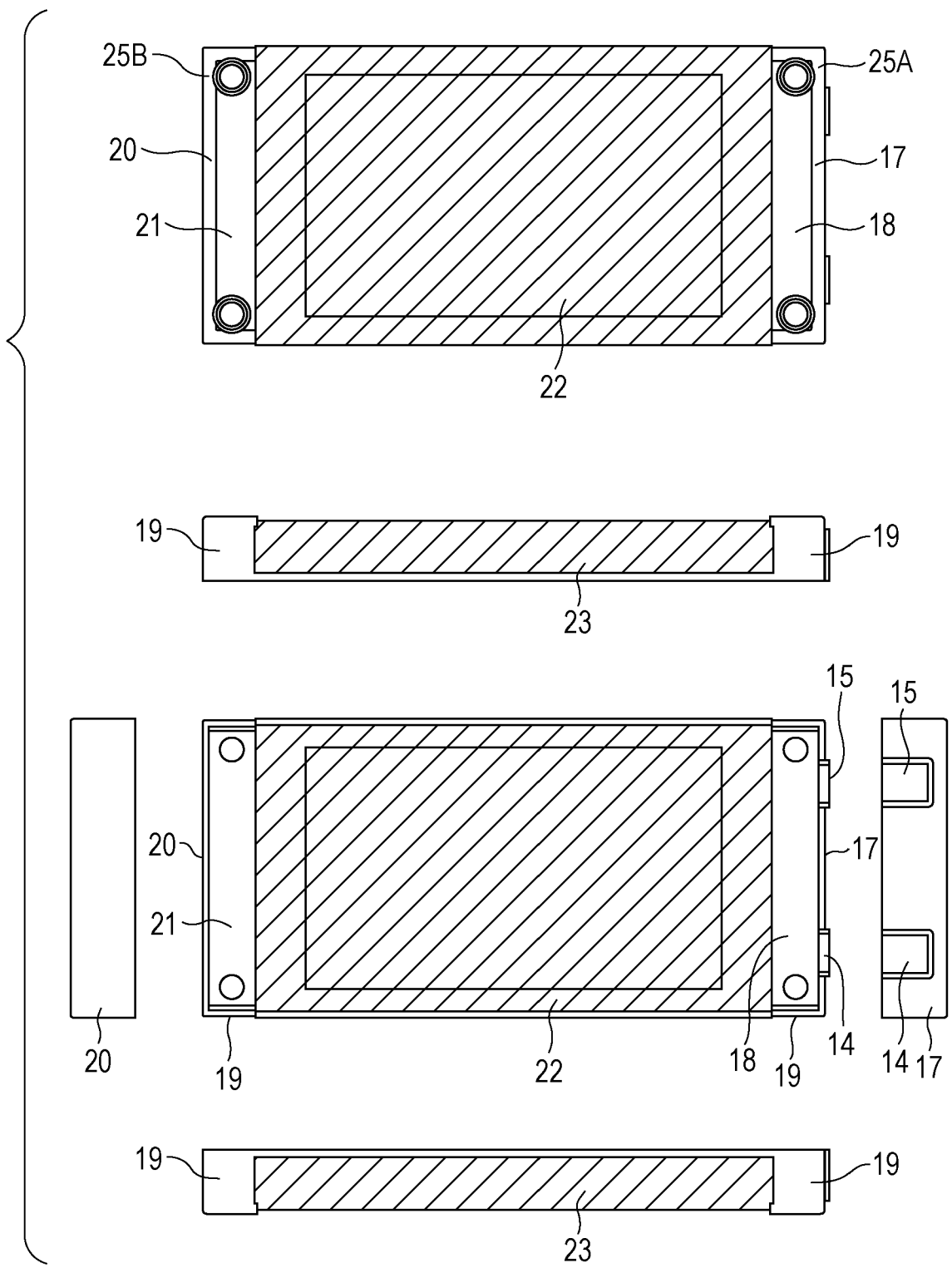
FIG. 4 illustrates a bottom case.
Figure 5:
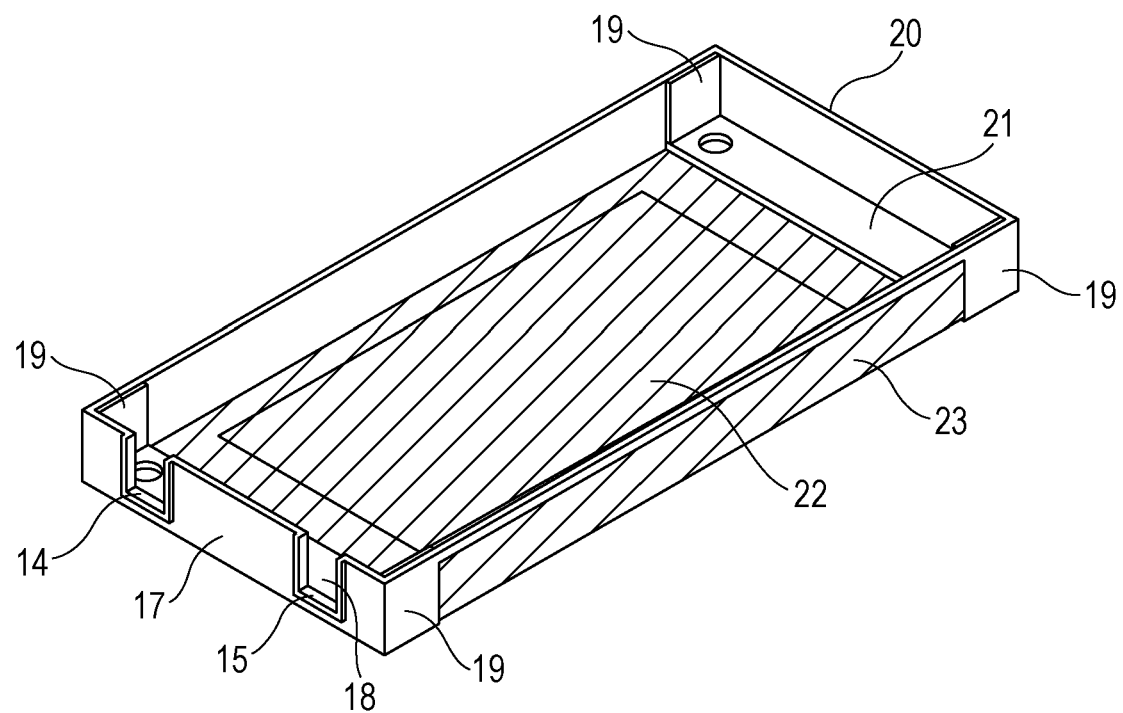
FIG. 5 is a perspective view of the bottom case.

Further, respective elements of the embodiment of the present disclosure are described. FIGS. 4 and 5 illustrate the bottom case 11. A surface of the battery unit 10 is composed of a bottom case 11 which includes the front face on which the angle nuts 12 and 13 are exposed, the back face which is opposed to the front face, the first lateral face, the second lateral face, and the bottom face and the top cover 28 which serves as an upper face of the battery unit 10. The top cover 28 is an insulating molded product which is made of resin.

The front face and the back face of the bottom case 11 are insulating faces made of resin, the bottom face of the bottom case 11 is a heat-transfer face made of a heat-transfer material such as aluminum, and the first and second lateral faces of the bottom case 11 have a bilayer structure of an insulating face and aluminum. In FIGS. 4 and 5, regions of heat-transfer faces are shaded. The insulating face and the heat-transfer face of the bottom case 11 can be integrally molded by insert molding. A product which is made of resign for insulation and aluminum for heat transfer can be integrally molded, so that increase of the number of elements can be prevented.

Front face resin 17, bottom face resin 18, and lateral face resin 19 are positioned close to the front faces of the secondary batteries 1-1 to 1-4 in the bottom case 11. Back face resin 20, bottom face resin 21, and lateral face resin 19 are positioned close to the back faces of the secondary batteries 1-1 to 1-4. In the bottom face of the bottom case 11, a region other than the bottom face resin 18 and the bottom face resin 21 which are respectively on the both end portions of the bottom face is a first heat-transfer face 22. The lateral face resin 19 is formed so as to continue to inner lateral faces of the bottom case 11.

On the other hand, on outer lateral faces of the bottom case 11, a second heat-transfer face 23 which is continuously raised from the heat-transfer face 22 is formed. The heat-transfer face 23 on the lateral face is formed up to a position slightly below the upper end face of the bottom case 11, and a portion around the upper end face is a region of the lateral face resin 19. Since the vicinity of the upper end face is made of resin, various methods may be employed as a method for fixing the top cover 28 to the bottom case 11. Further, along edges, which are on the front face side and the back face side, of the bottom face of the bottom case 11, positioning convex portions 25A and 25B are formed.

Figure 6:
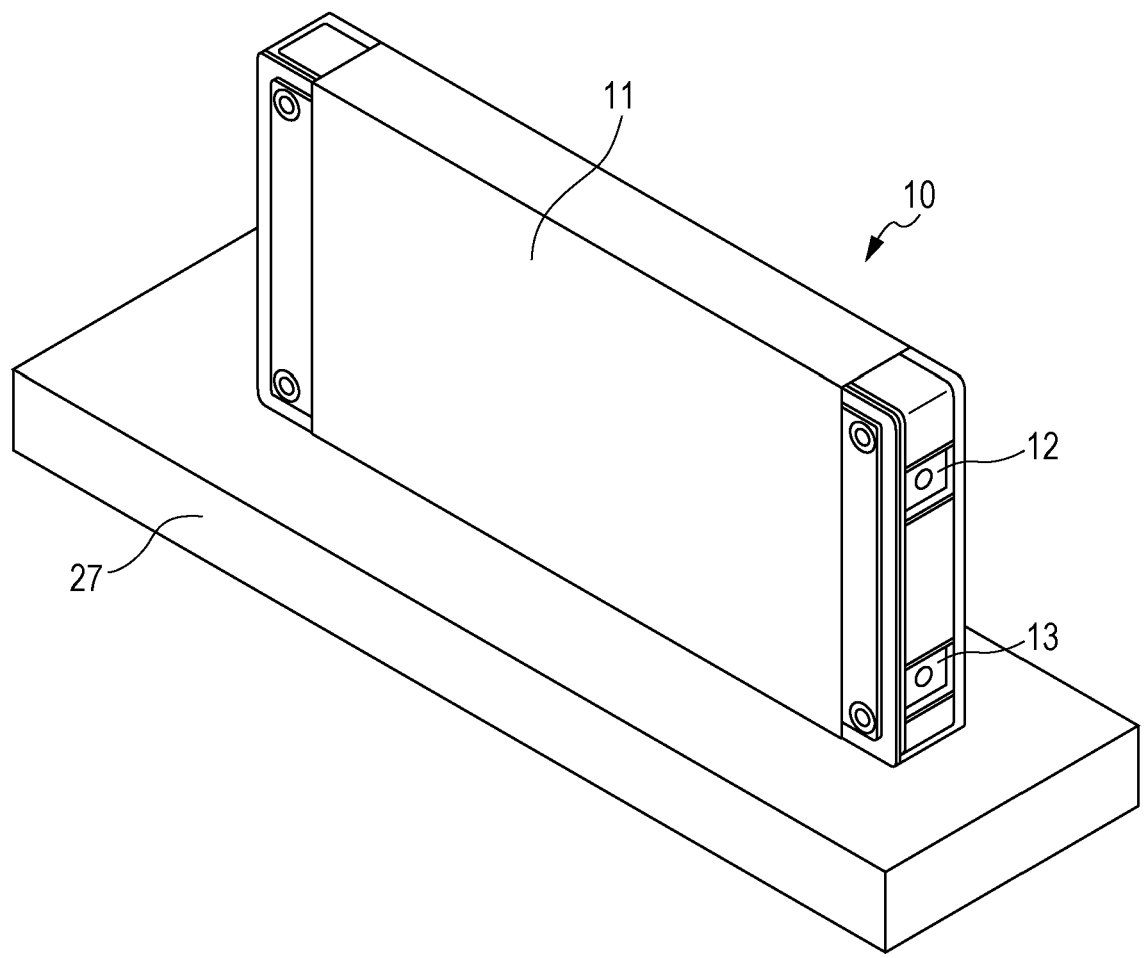
FIG. 6 is a schematic diagram illustrating a cooling method of the battery unit according to the embodiment of the present disclosure.

In the battery unit 10, generated heat inside the secondary batteries 1-1 to 1-4 is transferred to the heat-transfer face 22 which is the bottom face and further transferred to the heat-transfer face 23 which is the lateral face. Accordingly, the battery unit 10 can be cooled down by bringing the heat-transfer face 23 which is the lateral face into closely contact with a cooling face of a cooling unit 27, as illustrated in FIG. 6. Portions around the front face and the back face, and inner sides of the lateral faces of the bottom case 11 are made of resin. Accordingly, even in a case where the outer package member 3 is damaged due to shaking or the like, short circuit occurring via metal constituting the heat-transfer face can be prevented.

Figure 7:
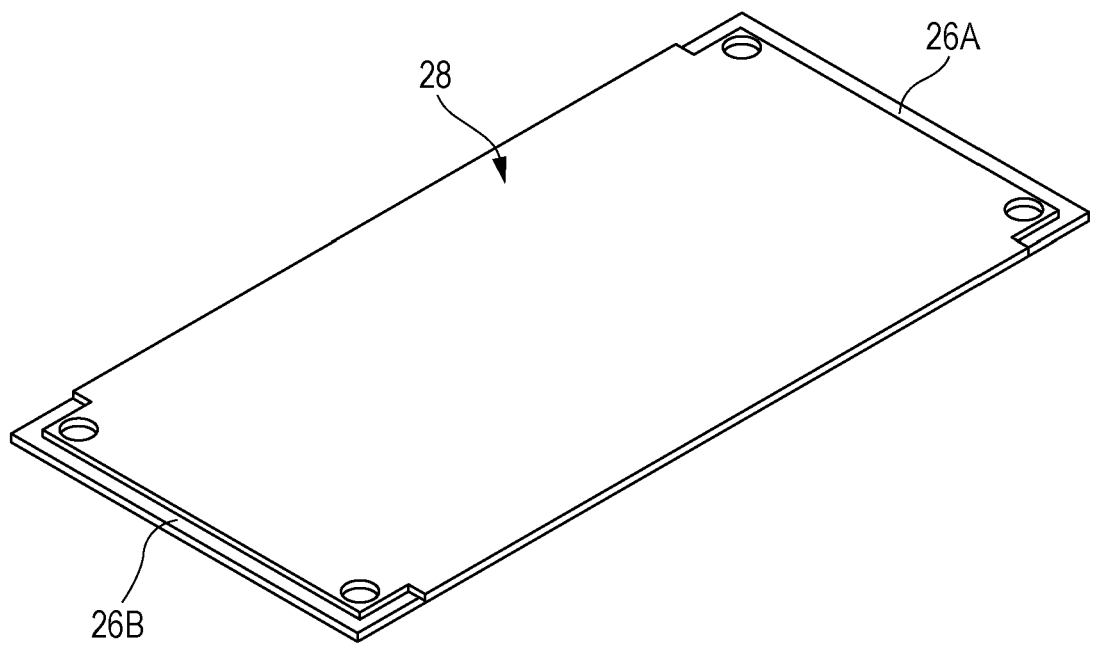
FIG. 7 is a perspective view of a top cover.

FIG. 7 illustrates the top cover 28 which is resin-molded. Along edges on front face side and the back face side of outer side faces of the top cover 28, positioning concave portions 26A and 26B are formed. When a plurality of battery units 10 are layered, positioning can be easily performed by using the convex portions 25A and 25B of the bottom case 11 and the concave portions 26A and 26B of the top cover 28.

[Series Connection Configuration]

As illustrated in FIGS. 8A and 8B, the battery unit 10 is configured such that a plurality of secondary batteries 1-1 to 1-4 are connected in series. The positive electrode tab 4-1 of the secondary battery 1-1 is connected with a bus bar 31A and a positive electrode side is led to the outside through an angle nut 12. Bus bars 31A, 31B, and 31C which are on the left side when viewed toward FIG. 8B are incorporated in the side holder 30, and bus bars 41A and 41B which are on the right side are incorporated in the side holder 40.

The negative electrode tab 5-1 of the secondary battery 1-1 is connected with a bus bar 41A. The positive electrode tab 4-2 of the secondary battery 1-2 is connected with the bus bar 41A. The negative electrode tab 5-2 of the secondary battery 1-2 is connected with a bus bar 31B. The positive electrode tab 4-3 of the secondary battery 1-3 is connected with the bus bar 31B. The negative electrode tab 5-3 of the secondary battery 1-3 is connected with a bus bar 41B. The positive electrode tab 4-4 of the secondary battery 1-4 is connected with the bus bar 41B. The negative electrode tab 5-4 of the secondary battery 1-4 is connected with a bus bar 31C. The negative electrode side is led to the outside through the bus bar 31C and the angle nut 13.

Thus, the secondary batteries 1-1 to 1-4 are connected in series via the bus bars. Voltage of the series connection of the battery unit 10 is monitored by an external control device and voltage of each of the batteries is monitored by the control device. Accordingly, as illustrated in FIG. 8B, each of the bus bars 31A to 31C is connected to a collecting and external-connecting connector 32 for sensing. In a similar manner, each of the bus bars 41A and 41B is connected to a collecting and external-connecting connector 42 for sensing.

In order to collect sensing terminals to one side of the battery unit 10, the connector 32 is connected to the connector 42 via a connecting line such as a flexible flat cable (FFC) 33. The FFC 33 has three lines and is disposed on an inner face of the top cover 28, for example. From the connector 42, five lines are led to an external battery control unit.

[Side Holder]

FIG. 9 illustrates the side holder 30. The side holder 30 is formed such that the bus bars 31A, 31B, and 31C are integrally molded in a resin block by insert molding. The side holder 30 has a hole which penetrates in an electrode tab lead-out direction (back and forth) such as a slit 34 of which a section has a rectangular shape, and the bus bar 31B is exposed in the slit 34. The bus bar 31A is electrically connected with the angle nut 12. The bus bar 31C is electrically connected with the angle nut 13. To circular holes formed on the both sides of the side holder 30, the sleeve holders 16 are respectively inserted.

FIG. 10 illustrates the side holder 40. The side holder 40 is formed such that the bus bars 41A and 41B are integrally molded in a resin block by insert molding. The side holder 40 has slits 35 and 36 which penetrate in a back and forth direction. The bus bar 41A is exposed in the slit 35, and the bus bar 41B is exposed in the slit 36.

Figure 11:
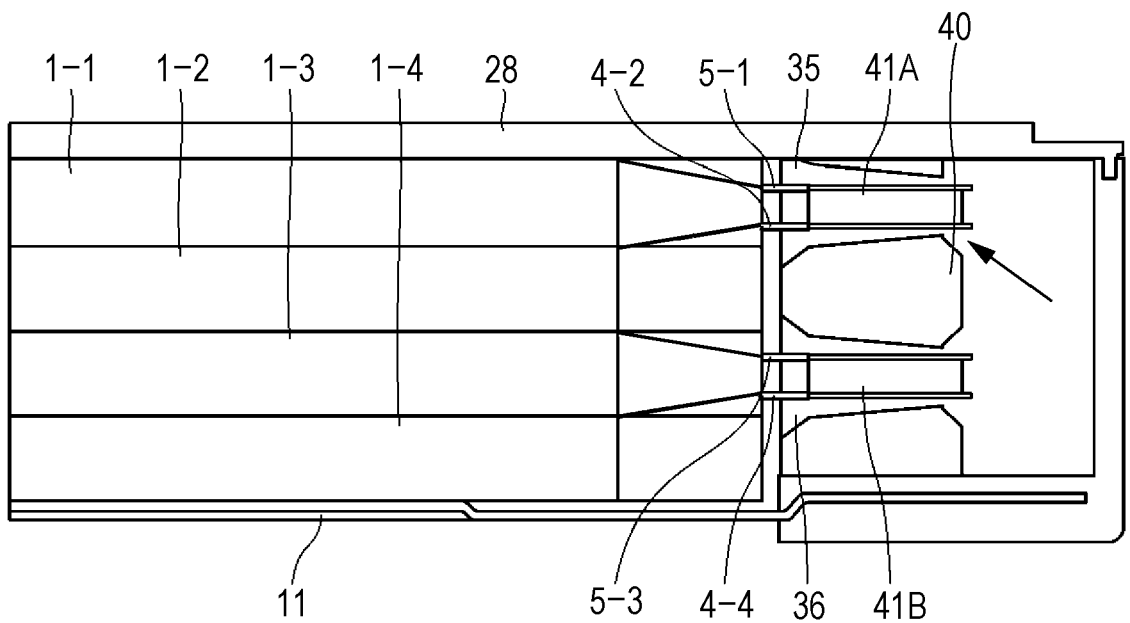
FIG. 11 is a sectional view illustrating the connection configuration of electrode tabs of the secondary batteries and bus bars.

The tab of the secondary battery and the bus bar are connected with each other by laser welding, for example. FIG. 11 illustrates the configuration of connecting of the bus bar 41A and the tab of the secondary battery and connecting of the bus bar 41B and the tab of the secondary battery in the side holder 40. The negative electrode tab 5-1 of the secondary battery 1-1 and the positive electrode tab 4-2 of the secondary battery 1-2 are inserted from an opening of the slit 35 of the side holder 40. The opening of the slit 35 is formed to be tapered from the entrance side which is expanded, and thus has a shape guiding the introduction of the negative electrode tab 5-1 and the positive electrode tab 4-2 to the bus bar 41A.

The negative electrode tab 5-1 and the positive electrode tab 4-2 are layered respectively on the upper and lower faces of the bus bar 41A to be held in the slit 35 of the side holder 40. Then, end faces of the bus bar 41A, the negative electrode tab 5-1, and the positive electrode tab 4-2 are irradiated with laser light from a side, which does not face the secondary battery, of the slit 35 of the side holder 40 as illustrated by an arrow, so as to be welded. A slanted face is formed on the edge of the other opening of the slit 35 so as to facilitate irradiation of the laser light. In a similar manner, the negative electrode tab 5-3 of the secondary battery 1-3 and the positive electrode tab 4-4 of the secondary battery 1-4 are inserted from the slit 36 and are connected with the bus bar 41B by laser welding.

[Parallel Connection Configuration]

The battery unit 10 described above is configured such that four secondary batteries 1-1 to 1-4 are connected in series. FIG. 12 is an exploded perspective view of a battery unit 50 in which three pieces of secondary batteries 1-1 to 1-3, for example, are connected in parallel. The secondary batteries 1-1 to 1-3 have such configuration that both of the positive electrode tabs 4-1 to 4-3 and the negative electrode tabs 5-1 to 5-3 are led from one end face thereof.

In a state that the top cover 52 is removed, the secondary batteries 1-1, 1-2, and 1-3 are stored with the thermal conductive sheets 2-1, 2-2, and 2-3 respectively interposed, in the bottom case 51 having the boxed shape. The width of a storing portion of the bottom case 51 is slightly larger than the widths of the secondary batteries 1-1 to 1-3, and inner faces of both lateral walls of the storing portion of the bottom case 51 are highly close to or brought into contact with the lateral faces on both sides of the secondary batteries 1-1 to 1-3. The bottom case 51 has an insulating face and a heat-transfer face as is the case with the bottom case 11 described above.

The thermal conductive sheets 2-1 to 2-3 are double-faced adhesive tapes having excellent thermal conductivity, for example. Thanks to the thermal conductive sheets 2-1 to 2-3, adjacent secondary batteries are thermally favorably joined with each other and positions of the secondary batteries 1-1 to 1-3 in the case are fixed.

Further, side holders 60 and 70 are inserted into the bottom case 51. The side holders 60 and 70 integrally include a bus bar by insert molding. The bus bar is a plate-shaped conductor which is formed by plating copper with nickel, for example, and is insulated by resin. The side holder 60 has a function to collect the tabs of the secondary batteries 1-1 to 1-3 by the bus bar and to lead a terminal to the outside. The side holder 70 has a function to hold the secondary batteries 1-1 to 1-3.

In the case of the parallel connection, the positive electrodes of the secondary batteries 1-1 to 1-3 are commonly connected to each other and the negative electrodes are commonly connected to each other. To the side holder 60, a bus bar to which the positive electrode tabs 4-1 to 4-3 of the secondary batteries 1-1 to 1-3 are connected and a bus bar to which the negative electrode tabs 5-1 to 5-3 of the secondary batteries 1-1 to 1-3 are connected are provided by insert molding.

Figure 13A:
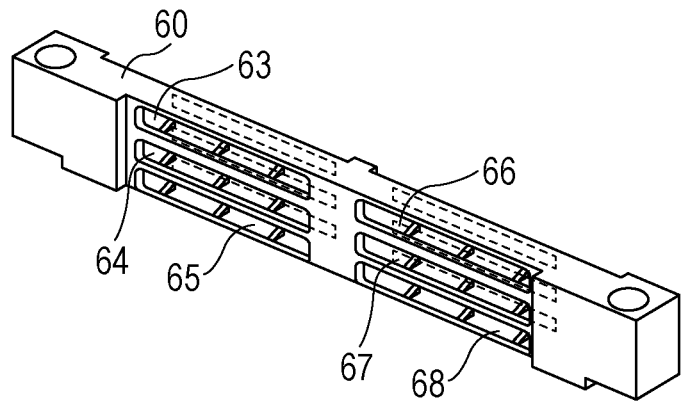
FIGS. 13A and 13B illustrate one side holder.
Figure 13B:
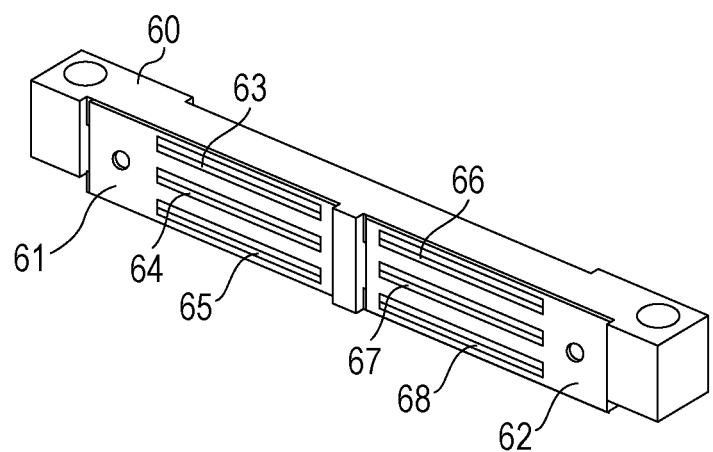

FIGS. 13A and 13B illustrate the side holder 60. To the side holder 60, a bus bar 61 for commonly connecting the positive electrode tabs and a bus bar 62 for commonly connecting the negative electrode tabs are provided by insert molding. On the bus bar 61, three slits 63, 64, and 65 are formed to be in parallel with each other.

The slits 63, 64, and 65 penetrate to a face, which faces the secondary batteries, of the side holder 60. Each of the slits has the inside having a shape for guiding and supporting the tabs. The positive electrode tabs 4-1 to 4-3 of the secondary batteries 1-1 to 1-3 are inserted from the slits 63, 64, and 65 up to slit openings of the bus bar 61. Then, the positive electrode tabs 4-1 to 4-3 and the bus bar 61 are connected by the laser welding at the slit openings of the bus bar 61.

On the side holder 60, slits 66, 67, and 68 are formed as is the case with the connection portion of the positive electrode tabs. The negative electrode tabs 5-1 to 5-3 of the secondary batteries 1-1 to 1-3 are inserted from the slits 66, 67, and 68 up to slit openings of the bus bar 62. Then, the negative electrode tabs 5-1 to 5-3 and the bus bar 62 are connected with each other by laser welding at the slit openings of the bus bar 62.

[Connection Configuration of Battery Unit]

Figure 14:
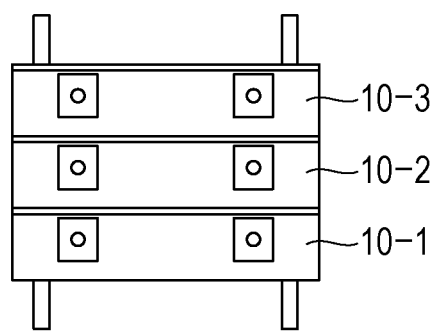
FIG. 14 is a schematic diagram illustrating the configuration in which a plurality of battery units are layered.

In a case of a vehicle which uses a battery of high output and high capacity, there is a case where a plurality of battery units 10-1, 10-2, 10-3, . . . are layered to be connected in series/in parallel, as illustrated in FIG. 14. In a case using a resin case, it has been difficult to stabilize an assembling state due to an effect of expansion, contraction and creep under high temperature and high pressure.

Figure 15A:
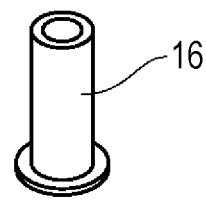
FIGS. 15A and 15B illustrate the configuration in which a plurality of battery units are layered.
Figure 15B:
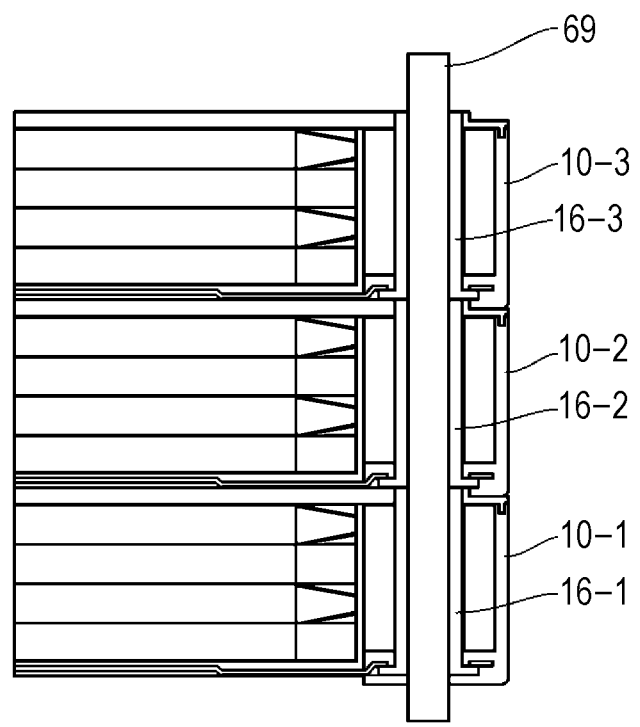

In the embodiment of the present disclosure, the sleeve holders 16 which are made of metal and depicted in FIG. 15A are inserted in side holders of respective batteries. Accordingly, as illustrated in FIG. 15B, it is possible that the battery units 10-1, 10-2, and 10-3 are layered and the sleeve holders 16-1, 16-2, and 16-3 are respectively positioned so as to penetrate a bolt 69 inside. A nut is attached to the bolt 69 and tightened by certain pressure so as to maintain the layered state.

Thus, the bolt 69 for joining does not contact with the side holder made of resin and is positioned inside the sleeve holders 16-1, 16-2, and 16-3 made of metal, so that the assembling state can be maintained without an influence of expansion and contraction of resin and creep under high temperature and high pressure.

[Connector for Cell Balance]

When a plurality of secondary batteries are used, it is favorable to attain cell balancing of respective secondary batteries so as to make the batteries provide sufficient performance. In the above-described connection configuration of FIGS. 8A and 8B, the connector 32 is coupled with the connector 42 via the connection line such as the flexible flat cable (FFC) 33 so as to collect sensing terminals to one end face of the battery unit 10. The FFC 33 includes three lines. Five lines are led from the connector 42 to an external battery control unit.

In particular, as illustrated in FIG. 16, the connector 32 is disposed in a concave portion which is on an intermediate portion of the side holder 30, and the connector 42 is disposed in a concave portion which is on an intermediate portion of the side holder 40. Then, the FFC 33 which connects the connector 32 and the connector 42 is disposed on an inner face of the top cover 28. A substrate of the external battery control unit is connected to the connector 42.

[Battery Module]

For the use in which high output and high capacity are demanded, such as an automobile and a power storage system, a battery module which is obtained by further layering above-described battery units is used. In such battery module as well, high volume energy density is demanded.

A secondary battery may swell due to overcharge, repetition of discharge and charge over a long period of time, use in an extremely high temperature state, and the like. Further, an outer shape of the secondary battery may change due to excessive swelling. Meanwhile, localized stress, which occurs due to such swelling, in the secondary battery accelerates property deterioration of the secondary battery. Therefore, it is desirable to remove localized stress occurring in the battery.

Figure 17A:
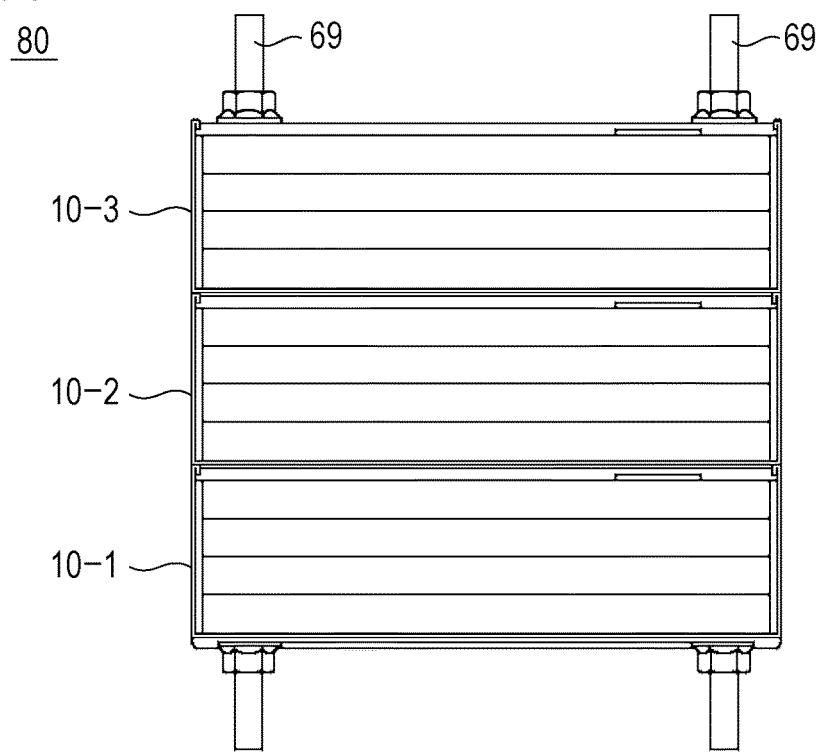
FIGS. 17A and 17B are sectional views illustrating the configuration of a battery module.
Figure 17B:
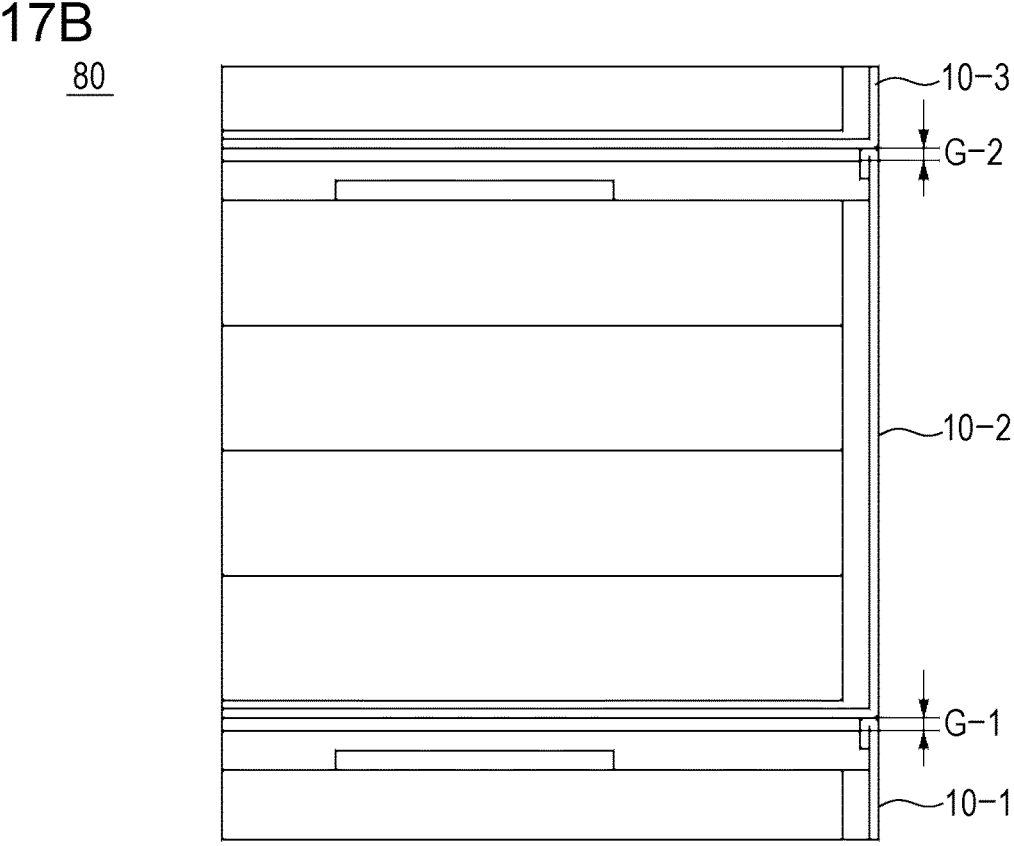

FIG. 17A illustrates the sectional configuration of a battery module 80 which is formed by layering three battery units 10-1, 10-2, and 10-3 in sequence from the bottom. A stable layering state of the battery module 80 is maintained by bolts 69 which penetrate in respective sleeve holders, which are not depicted, of the three battery units 10-1, 10-2, and 10-3. FIG. 17B is a partially-enlarged view of FIG. 17A. In FIG. 17B, a space (arbitrarily referred to below as a gap) G-1 formed between an upper face of the battery unit 10-1 and a bottom face of the battery unit 10-2 opposed to the battery unit 10-1 and a gap G-2 formed between an upper face of the battery unit 10-2 and a bottom face of the battery unit 10-3 are depicted. In the embodiment of the present disclosure, swelling of a secondary battery is absorbed by the battery unit (battery pack) inside configuration in which these gaps G-1 and G-2 are effectively used. Three examples of the configuration of a battery module in which a gap is formed between a plurality of battery units are described below.

Figure 18A:
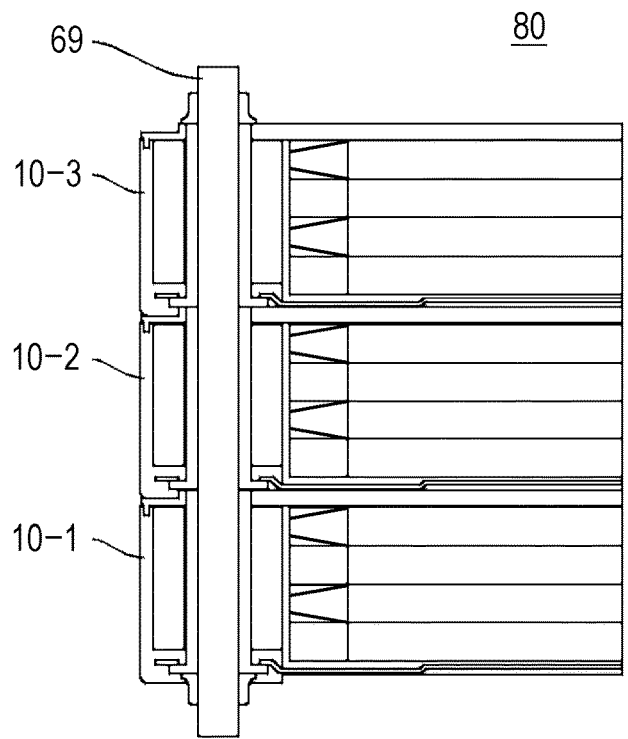
FIGS. 18A and 18B are respectively a sectional view and an enlarged view which illustrate an example of the battery module according to the embodiment of the present disclosure.
Figure 18B:
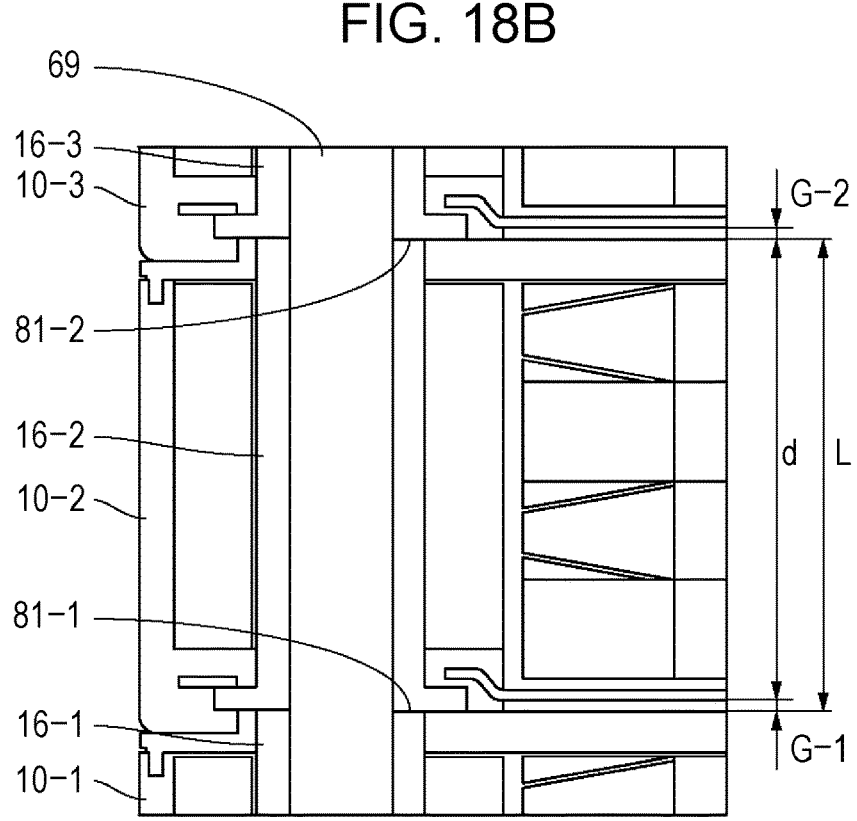

FIG. 18A illustrates an example of the sectional configuration of a battery module in which gaps are formed between a plurality of battery units by a sleeve holder. The battery module 80 is formed by layering the three battery units 10-1, 10-2, and 10-3 in sequence from the bottom. The three battery units 10-1, 10-2, and 10-3 are layered to be positioned by a bolt 69, thus stably maintaining an integrated layering state of the battery module 80. The bolt 69 is preferably made of metal. FIG. 18B is a partially-enlarged view of FIG. 18A. In FIG. 18B, a gap G-1 formed between the upper face of the battery unit 10-1 and the bottom face of the battery unit 10-2 and a gap G-2 formed between the upper face of the battery unit 10-2 and the bottom face of the battery unit 10-3 are depicted. In the three battery units 10-1, 10-2, and 10-3, sleeve holders 16-1, 16-2, and 16-3 are respectively incorporated.

The sleeve holder 16-1 and the sleeve holder 16-2 contact with each other at a contact face 81-1 having a ring shape. In a similar manner, the sleeve holder 16-2 and the sleeve holder 16-3 contact with each other at a contact face 81-2 having a ring shape. The sleeve holder 16-2 is formed to have the length L which is longer than the thickness d of the battery unit 10-2, forming the gap G-1. In a similar manner, the gap G-2 is formed on the basis of the relationship between the length of the sleeve holder 16-3 and the thickness of the battery unit 10-3. As described above, the sleeve holder is preferably made of metal. Accordingly, the assembling state can be stably maintained while maintaining the strength of the battery module even when gaps are formed between respective battery units.

In this example, the sleeve holders 16-1, 16-2, and 16-3 are molded respectively integrally with the battery units 10-1, 10-2, and 10-3 by insert molding. The sleeve holders may have the configuration integrated with the battery units as described above or may have the configuration separated from the battery units. In a case of the sleeve holders having the configuration integrated with the battery units, a dimension of a gap between the battery units can be preliminarily determined. On the other hand, the sleeve holders having the configuration separated from the battery units can be exchanged even after an operation of the battery module. Accordingly, in a case of the sleeve holders having the separate configuration, a dimension of a gap between the battery units can be arbitrarily adjusted. Further, in either case of the integrated configuration or the separated configuration, a desired gap can be formed by forming a sleeve holder in a predetermined dimension, without changing the standard of the battery unit.

Figure 19A:
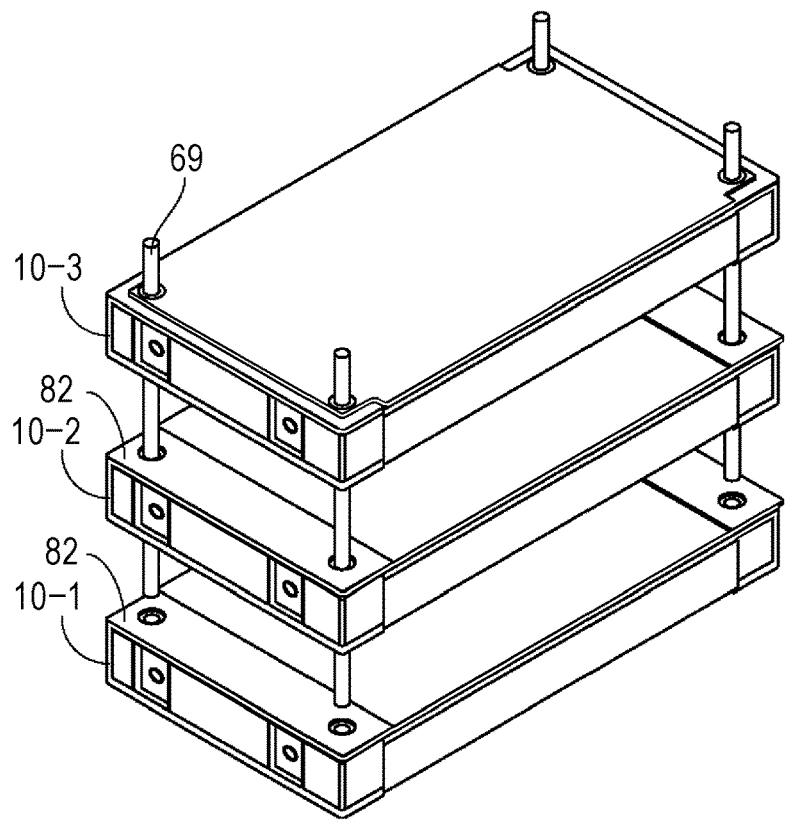
FIGS. 19A and 19B are assembling diagrams illustrating another example of the battery module according to the embodiment of the present disclosure.

An example that a gap is formed between a plurality of battery units by a plate member or a washer is now described. FIG. 19A is an assembling diagram illustrating an example of the configuration of a battery module in which a gap is formed between a plurality of battery units by using a plate member. A plate member serves as a spacer. The battery module 80 is formed by layering the three battery units 10-1, 10-2, and 10-3 in sequence from the bottom. Plate members 82 are provided respectively between the battery units 10-1 and 10-2 and between the battery units 10-2 and 10-3. The bolt 69 penetrates through the three battery units 10-1, 10-2, and 10-3 and the plate members 82. Then, a nut which is not depicted is attached to be tightened by predetermined pressure. Accordingly, an integrated layering state of the battery module 80 is stably maintained. The bolt 69 and the plate member 82 are preferably made of metal. The plate members 82 are used in pairs. The plate members 82 are disposed on the top cover of each of the battery units 10-1 and 10-2 in a manner to be close to the front face and the back face of each of the battery units 10-1 and 10-2. The positions of the plate members 82 approximately correspond to positions on the side holders 30 and 40 which are described above. In the plate member 82, a circular hole corresponding to the bolt 69 which penetrates is formed. The plate member 82 has a predetermined thickness. A dimension of a gap between the battery units is determined in accordance with the thickness of the plate member 82. The plate member 82 can be exchanged and added even after an operation of the battery module. Accordingly, a dimension of the gap between the battery units can be arbitrarily adjusted by the plate member 82.

Figure 19B:
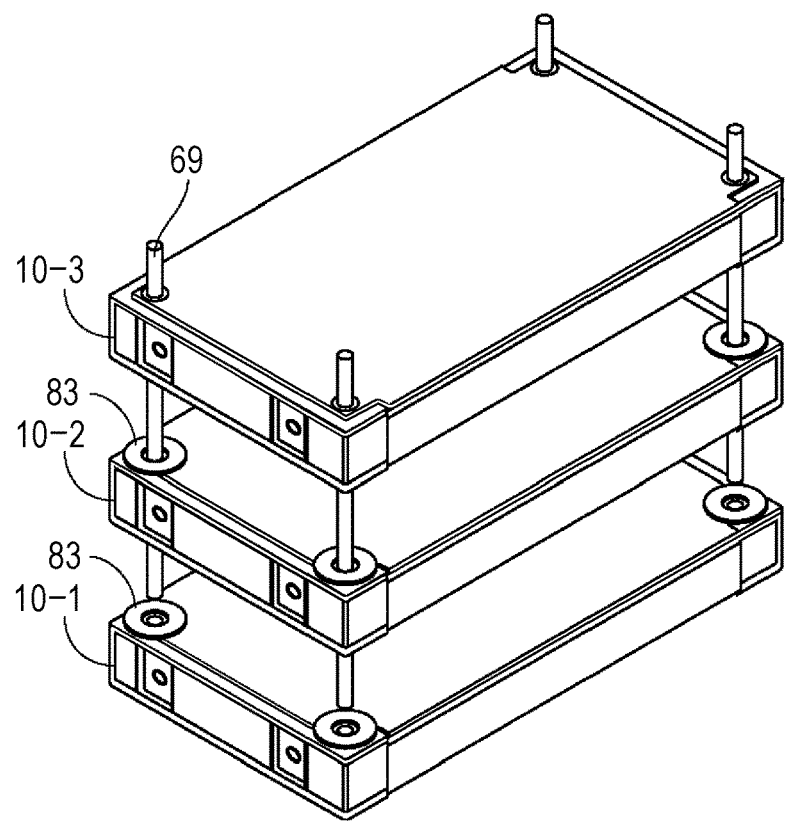

FIG. 19B is an assembling diagram illustrating an example of the configuration of a battery module in which a gap is formed between a plurality of battery units by a washer. The battery module 80 is formed by layering the three battery units 10-1, 10-2, and 10-3 in sequence from the bottom. Washers 83 are provided respectively between the battery units 10-1 and 10-2 and between the battery units 10-2 and 10-3. The bolt 69 penetrates through the three battery units 10-1, 10-2, and 10-3 and the washers 83. Then, a nut which is not depicted is attached to be tightened by predetermined pressure. Accordingly, an integrated layering state of the battery module 80 is stably maintained. The bolt 69 and the washer 83 are preferably made of metal. The washers 83 are used by a set of four washers. The washers 83 are disposed on two positions, on the top cover of each of the battery units 10-1 and 10-2, which are close to the front faces of each of the battery units 10-1 and 10-2, and two positions which are close to the back faces (in other words, four corner portions on the top cover). The positions of the washers 83 are on the circular holes which are formed on the top cover. The washer 83 is selected in accordance with an outer diameter of the bolt 69 which penetrates. A plurality of washers 83 may be layered and used so as to obtain a predetermined thickness. A dimension of a gap between the battery units is determined in accordance with the thickness of the washer 83. The washer 83 can be exchanged and added even after an operation of the battery module. Accordingly, a dimension of the gap between the battery units can be arbitrarily adjusted by the washer 83. A ready-made product may be used as the washer 83, so that a new part does not have to be produced.

In the examples of the plate member and the washer, the configuration in which no sleeve holder is used may be employed according to circumstances because the plate member and the washer can serve as the sleeve holder. Further, the length of the sleeve holder can be designed freely. If the sleeve holder is designed to have the length enough to protrude from the top cover, the plate member and the washer are easily positioned. Contact areas of the plate member and the washer are large, so that pressure in layering the battery units is dispersed. Further, the sleeve holder, the plate member, and the washer may be used in an arbitrarily-combined manner.

Figure 20A:
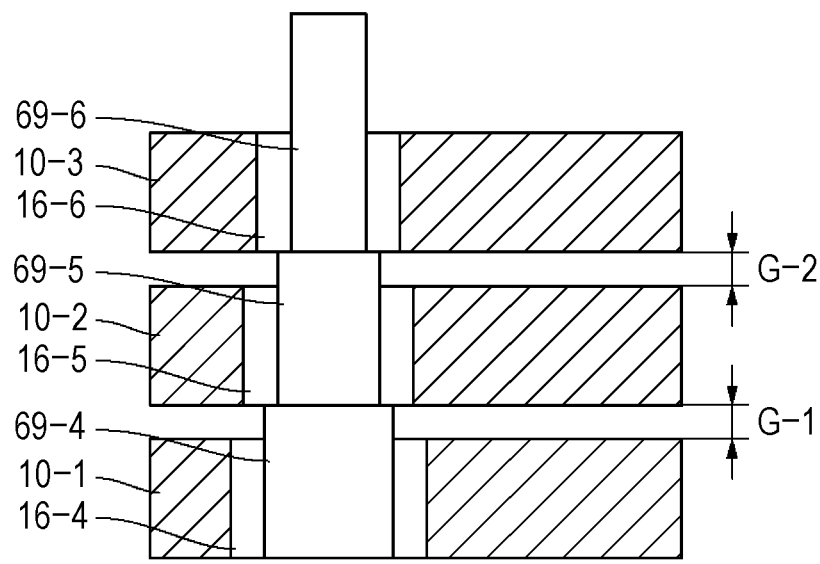
FIGS. 20A and 20B are respectively a sectional view and an enlarged view that illustrate still another example of the battery module according to the embodiment of the present disclosure.

An example that a gap is formed between a plurality of battery units depending on a shape of a bolt is now described. FIG. 20A illustrates an example of the sectional configuration of a battery module in which a gap is formed between a plurality of battery units depending on a shape of a bolt. The battery module 80 is formed by layering the three battery units 10-1, 10-2, and 10-3 in sequence from the bottom. The three battery units 10-1, 10-2, and 10-3 are layered to be positioned by a bolt 69, thus stably maintaining an integrated layering state of the battery module 80. The bolt 69 is preferably made of metal. In FIG. 20A, a gap G-1 formed between the upper face of the battery unit 10-1 and the bottom face of the battery unit 10-2 and a gap G-2 formed between the upper face of the battery unit 10-2 and the bottom face of the battery unit 10-3 are depicted. To the three battery units 10-1, 10-2, and 10-3, sleeve holders 16-4, 16-5, and 16-6 are respectively fitted. Further, to the sleeve holders 16-4, 16-5, and 16-6, bolts 69-4, 69-5, and 69-6 are respectively fitted. The sleeve holders 16 and the bolts 69 are firmly fixed by a method in which the bolt 69 is pressed in the sleeve holder 16, a method in which the sleeve holder 16 and the bolt 69 are bonded, and the like.

In this example, diameters of circular holes which are formed in respective battery units 10 are different from each other. In particular, the diameter of the circular hole of the battery unit 10-1 is the largest and the diameter of the circular hole of the battery unit 10-3 is the smallest. In other words, a circular hole of the battery unit 10 which is layered on a more upper side has a smaller diameter. Corresponding to this, an outer diameter and an inner diameter of the sleeve holder 16-4 are the largest and an outer diameter and an inner diameter of the sleeve holder 16-6 are the smallest. In other words, an outer diameter and an inner diameter of the sleeve holder 16 which is fitted to the battery unit 10 which is layered on a more upper side are smaller. Corresponding to this, an outer diameter of the bolt 69-4 is similarly the largest and an outer diameter of the bolt 69-6 is the smallest. In other words, in the bolt 69 which is formed to have a stair-like cylindrical shape, an outer diameter of a penetrating portion of the battery unit 10 which is layered on the more upper side is smaller. Further, it is preferable that the outer diameter of the bolt 69-4 be larger than the inner diameter of the sleeve holder 16-5 and smaller than the outer diameter of the sleeve holder 16-5. Further, it is preferable that the outer diameter of the bolt 69-5 be larger than the inner diameter of the sleeve holder 16-6 and smaller than the outer diameter of the sleeve holder 16-6. Due to these configurations, the bolt 69-4 does not penetrate through the battery unit 10-2 (the sleeve holder 16-5). Further, the bolt 69-5 does not penetrate through the battery unit 10-3 (the sleeve holder 16-6). The height of the bolt 69-4 and the height of the bolt 69-5 are respectively larger than the thickness of the battery unit 10-1 and the thickness of the battery unit 10-2. By difference between the height and the thickness, the gap G-1 and the gap G-2 are formed. Here, it is advantageous in a point of the strength that the bolts 69-4, 69-5, and 69-6 are integrally formed.

Figure 20B:
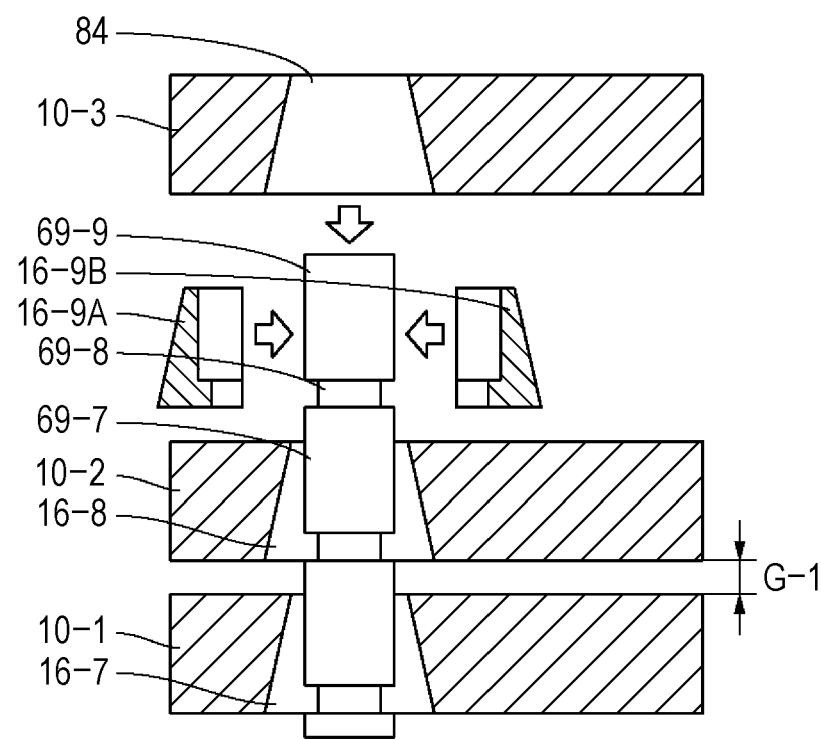

FIG. 20B illustrates an example of the sectional configuration of a battery module in which a gap is formed between a plurality of battery units by a bolt having another shape. FIG. 20B is illustrated as a partial assembling drawing. For the construction of the battery module 80, the battery units 10-1, 10-2, and 10-3, sleeve holders 16-7, 16-8, 16-9A, and 16-9B, and bolts 69 are prepared. FIG. 20B illustrates a stage that two battery units 10-1 and 10-2 are layered in sequence from the bottom. A gap G-1 formed between the upper face of the battery unit 10-1 and the bottom face of the battery unit 10-2 is depicted. To the battery units 10-1 and 10-2, the sleeve holders 16-7 and 16-8 are respectively fitted. Further, to the sleeve holders 16-7 and 16-8, the bolts 69 are fitted. The bolt 69 is preferably made of metal in a similar manner. After the illustrated stage, the battery unit 10-3 is layered.

In all of the battery units 10-1, 10-2, and 10-3 in this example, a hole 84 which has a shape obtained by hollowing a truncated cone is similarly formed. The diameter of the hole 84 becomes smaller toward the upper face of each of the battery units 10 and becomes larger toward the bottom face of each of the battery units 10. Further, the sleeve holders 16-7, 16-8, 16-9A, and 16-9B are formed to have an outer peripheral face of a truncated cone shape and be fitted to the hole 84. That is, an outer diameter of the sleeve holder 16 becomes smaller toward an end, which is fitted near the upper face of each of the battery units 10, of the sleeve holder 16 and an outer diameter, which is fitted near the bottom face of each of the battery units 10, of the sleeve holder 16 becomes larger toward a base of the sleeve holder 16. A hole through which the bolt 69 penetrates is formed in each of the sleeve holders 16. The hole is formed in a stair-like shape of two steps, an inner diameter on the end side of the sleeve holder 16 is large, and an inner diameter on the base side of the sleeve holder 16 is small. Each of the sleeve holders 16 is cut in a direction orthogonal to the bottom face of the truncated cone. FIG. 20B illustrates a state that the sleeve holders 16-9A and 16-9B are cut off. It is designed such that the sleeve holders 16-9A and 16-9B are assembled to be one sleeve holder 16-9. The bolt 69 has such shape that two different outer diameters are alternately repeated. In FIG. 20B, a bolt 69-8 which has a small outer diameter is disposed between bolts 69-7 and 69-9 which have a large outer diameter. The bolt 69-8 which has the small outer diameter is designed to have the length enough to be fitted to the base side, of which the inner diameter is small, of the sleeve holder 16. Difference which is obtained by subtracting the thickness of each of the battery units 10 from a sum of the length of the bolt 69-7 having the large outer diameter and the length of the bolt 69-8 having the small outer diameter is the gap G-1.

An assembling method of the battery module 80 in this example is now described. The battery module 80 is assembled in an order of the battery units 10-1, 10-2, and 10-3. In FIG. 20B, assembling until the battery unit 10-2 has been finished, so that a method of assembling the battery unit 10-3 is described here. First, the sleeve holders 16-9A and 16-9B to which a hole is formed to have a stair-like shape are attached around the bolt 69. The base sides, which have the small inner diameter, of the sleeve holders 16-9A and 16-9B are fitted to the bolt 69-8 which has the small outer diameter. The end sides, which have the large inner diameter, of the sleeve holders 16-9A and 16-9B are fitted to the bolt 69-9 which has the large outer diameter. The base side of the sleeve holder 16 which is formed to have the length enough to be fitted to the bolt 69-8 is positioned between the bolts 69-7 and 69-9. Then, the sleeve holders 16-9A and 16-9B and the bolt 69 that are integrated are inserted into the hole 84 of the battery unit 10-3. The sleeve holder 16-9 which has an outer peripheral face of a truncated cone shape is fitted to the hole 84 which has a shape obtained by hollowing a truncated cone. At this time, a gap having the length of a protrusion portion of the bolt 69-7 which is protruded from the upper face of the battery unit 10-2 is formed between the bottom faces of the battery unit 10-3 and the sleeve holder 16-9 and the upper face of the battery unit 10-2. Thus, the three battery units 10-1, 10-2, and 10-3 are layered to be positioned by the bolt 69 and an integrated layering state of the battery module 80 is stably maintained. Due to these configurations, holes formed in battery units and sleeve holders can be respectively formed to have uniform shapes, improving productivity.

In the above-described examples of the shape of the bolt, not only sleeve holders but also bolts are engaged, so that the battery units can be supported more solidly against tightening pressure. Accordingly, the integrated layering state of the battery module is more stably maintained.

Three examples of the configuration of the battery module in which a gap is formed between a plurality of battery units are described above. In the battery module of the embodiment of the present disclosure, a gap is formed between a plurality of battery units. When a secondary battery in the battery unit swells, this gap absorbs the swelling. Accordingly, even if the secondary battery swells, change in the outer shape of the battery unit due to the effect of the swelling does not occur. Thus, the plurality of battery units can be maintained without changing the outer shapes. Accordingly, volume energy density of the battery module of the embodiment of the present disclosure can be maintained high. Meanwhile, the configuration in which a gap is formed between a plurality of battery units does not prevent deformation of a secondary battery which is in swelling. Accordingly, even if the secondary battery swells, the battery module can be continuously used while avoiding an occurrence of localized stress of the secondary battery in the battery unit. Thus, property deterioration of the secondary battery can be suppressed and operation life of the secondary battery can be prolonged. As described above, the embodiment of the present disclosure realizes long operation life of a secondary battery while absorbing swelling of the secondary battery by the configuration in which gaps are effectively formed in the battery unit without increasing the number of components.

The embodiment of the present disclosure may have the following configuration as well.

(1) A battery unit includes a box-shaped case in which a plurality of secondary batteries are stored and that includes a front face, a back face, a first lateral face, a second lateral face, a first main face, and a second main face, a first heat-transfer face that is provided on one faces of the first and second main faces of the case, a second heat-transfer face that is formed on at least one faces of the first and second lateral faces and is continued to the first heat-transfer face, and an insulating face that is formed on the front face, the back face, the other faces of the first and second main faces, and an inner face of the second heat-transfer face. In the battery unit, a battery element of the secondary batteries is stored in an outer package member and positive and negative electrode tabs are led out.

(2) In the battery unit according to (1), the first and second heat-transfer faces and the insulating face of the case are integrally formed.

(3) The battery unit according to (1) or (2), further includes a first holder that is disposed in a space, which is between the front face of the case and front faces of the plurality of secondary batteries, of the case, and a second holder that is disposed in a space, which is between the back face of the case and back faces of the plurality of secondary batteries, of the case.

(4) In the battery unit according to any of (1) to (3), a conductive portion that is connected with the electrode tabs of the plurality of secondary batteries is formed on at least one of the first holder that is disposed in a space, which is between the front face of the case and the front faces of the plurality of secondary batteries, of the case, and the second holder that is disposed in a space, which is between the back face of the case and the back faces of the plurality of secondary batteries, of the case.

(5) In the battery unit according to any of (1) to (4), a hole that penetrates the holder in an electrode lead-out direction is formed on at least one of the first holder that is disposed in a space, which is between the front face of the case and the front faces of the plurality of secondary batteries, of the case, and the second holder that is disposed in a space, which is between the back face of the case and the back faces of the plurality of secondary batteries, of the case, a conductive portion configured to connect the electrode tabs of the plurality of secondary batteries is exposed in the hole, and an end portion of the electrode tabs that are inserted from one opening of the hole is connected with the conductive portion.

(6) In the battery unit according to any of (1) to (5), a hole that penetrates the holder in an electrode lead-out direction is formed on at least one of the first holder that is disposed in a space, which is between the front face of the case and the front faces of the plurality of secondary batteries, of the case, and the second holder that is disposed in a space, which is between the back face of the case and the back faces of the plurality of secondary batteries, of the case, a conductive portion configured to connect the electrode tabs of the plurality of secondary batteries is exposed in the hole, an end portion of the electrode tabs that are inserted from one opening of the hole is connected with the conductive portion, holes that penetrate both end portions of the first and second holders and positions, which correspond to the both end portions, of the case are formed, and metal sleeves are respectively fitted in the holes.

(7) A battery module includes at least two battery units that are layered to be opposed to each other and have a gap therebetween. In the battery module, the battery units includes a box-shaped case in which a plurality of secondary batteries are stored and that includes a front face, a back face, a first lateral face, a second lateral face, a first main face, and a second main face, a first heat-transfer face that is provided on one faces of the first and second main faces of the case, a second heat-transfer face that is formed on at least one faces of the first and second lateral faces and is continued to the first heat-transfer face, and an insulating face that is formed on the front face, the back face, the other faces of the first and second main faces, and an inner face of the second heat-transfer face, and a battery element of the secondary batteries is stored in an outer package member and positive and negative electrode tabs are led out.

[Power Storage System in House as Application Example]

An example in which the embodiment of the present disclosure is applied to a house power storage system is described with reference to FIG. 21. For example, in a power storage system 100 for a house 101, power is supplied from a centralized power system 102 including thermal power generation 102a, nuclear power generation 102b, hydropower generation 102c, and the like to a power storage device 103 via a power network 109, an information network 112, a smart meter 107, a power hub 108, and the like. At the same time, power is supplied from an independent power source such as a domestic power generation device 104 to the power storage device 103. The power supplied to the power storage device 103 is stored. Power used in the house 101 is supplied by using the power storage device 103. Not limitedly used in the house 101, a similar power storage system may be used in a building as well.

To the house 101, a power generation device 104, a power consuming device 105, the power storage device 103, a control device 110 which controls each device, the smart meter 107, and various types of sensors 111 which acquires information are provided. Respective devices are connected with each other by the power network 109 and the information network 112. A solar cell, a fuel cell, and the like are used as the power generation device 104, and generated power is supplied to the power consuming device 105 and/or the power storage device 103. Examples of the power consuming device 105 include a refrigerator 105a, an air conditioner 105b, a television receiver 105c, a bath 105d, and the like. Examples of the power consuming device 105 further include an electric vehicle 106. Examples of the electric vehicle 106 include an electric car 106a, a hybrid car 106b, and an electric motorcycle 106c.

To the power storage device 103, the above-described battery unit or the battery module of the embodiment of the present disclosure is applied. The power storage device 103 is composed of a secondary battery or a capacitor. For example, the power storage device 103 is composed of a lithium-ion battery. The lithium-ion battery may be stationary or used in the electric vehicle 106. The smart meter 107 has a function to measure a consumption amount of commercial power and send the measured consumption amount to an electric power company. The power network 109 may employ any one of DC power feeding, AC power feeding, and contactless power feeding or a combination of these.

Examples of the various types of sensors 111 include a human detection sensor, an illuminance sensor, an object detection sensor, a power consumption sensor, a vibration sensor, a contact sensor, a temperature sensor, an infrared sensor, and the like. Information acquired by the various types of sensors 111 is transmitted to the control device 110. By the information from the sensors 111, a state of weather, a state of human, and the like are recognized, and therefore the power consuming device 105 is automatically controlled, being able to minimize energy consumption. Further, the control device 110 can transmit information about the house 101 to an outside electric power company via Internet.

At the power hub 108, processing such as branching of a power line and DC-AC conversion is performed. As a communication method of the information network 112 which is connected with the control device 110, there are a method which uses a communication interface such as a universal asynchronous receiver-transceiver (UART) and a method which uses sensor network by a wireless communication standard such as Bluetooth, ZigBee, and Wi-Fi. The Bluetooth method is applied to multi-media communication and enables communication of one-to-many connection. ZigBee uses a physical layer of institute of electrical and electronics engineers (IEEE) 802.15.4. IEEE802.15.4 is a name of a short-distance wireless network standard which is referred to as personal area network (PAN) or wireless PAN (WPAN).

The control device 110 is connected with an external server 113. The server 113 may be administrated by any of the house 101, an electric power company, and a service provider. Information which is received/transmitted by/from the server 113 is power consumption information, life pattern information, an electric power fee, weather information, natural disaster information, and information about electricity trading. These pieces of information may be transmitted/received from a domestic power consuming device (for example, a television receiver) and may be transmitted/received from a device outside the home (for example, a portable telephone and the like). These pieces of information may be displayed on a device having a display function such as a television receiver, a portable telephone, and personal digital assistants (PDA).

The control device 110 which controls respective elements is composed of a central processing unit (CPU), a random access memory (RAM), a read only memory (ROM), and the like, and is stored in the power storage device 103 in this example. The control device 110 is connected with the power storage device 103, the domestic power generation device 104, the power consuming device 105, the various types of sensors 111, and the server 113 via the information network 112, and has a function to adjust a consumption amount of commercial power and an amount of power generation, for example. The control device 110 may further have a function to perform electric power trading in an electric power market.

As described above, not only power generated by the centralized power system 102 such as the thermal power generation 102a, the nuclear power generation 102b, and the hydropower generation 102c but also power generated by the domestic power generation device 104 (solar power generation, wind power generation) can be stored in the power storage device 103. Accordingly, even if generated power of the domestic power generation device 104 fluctuates, control of stabilizing an amount of power which is sent out to the outside or discharging sufficient power can be performed. For example, it is possible that power obtained by solar power generation is stored in the power storage device 103, inexpensive midnight power is stored in the power storage device 103 at night, and the power stored in the power storage device 103 may be used during a daytime zone in which the rate is expensive.

Here, the control device 110 is stored in the power storage device 103 in this example, but the control device 110 may be stored in the smart meter 107 or may be configured independently. Further, the power storage system 100 may be used in a plurality of households of multifamily residential building or in a plurality of single-family houses.

[Power Storage System in Vehicle as Application Example]

Figure 22:
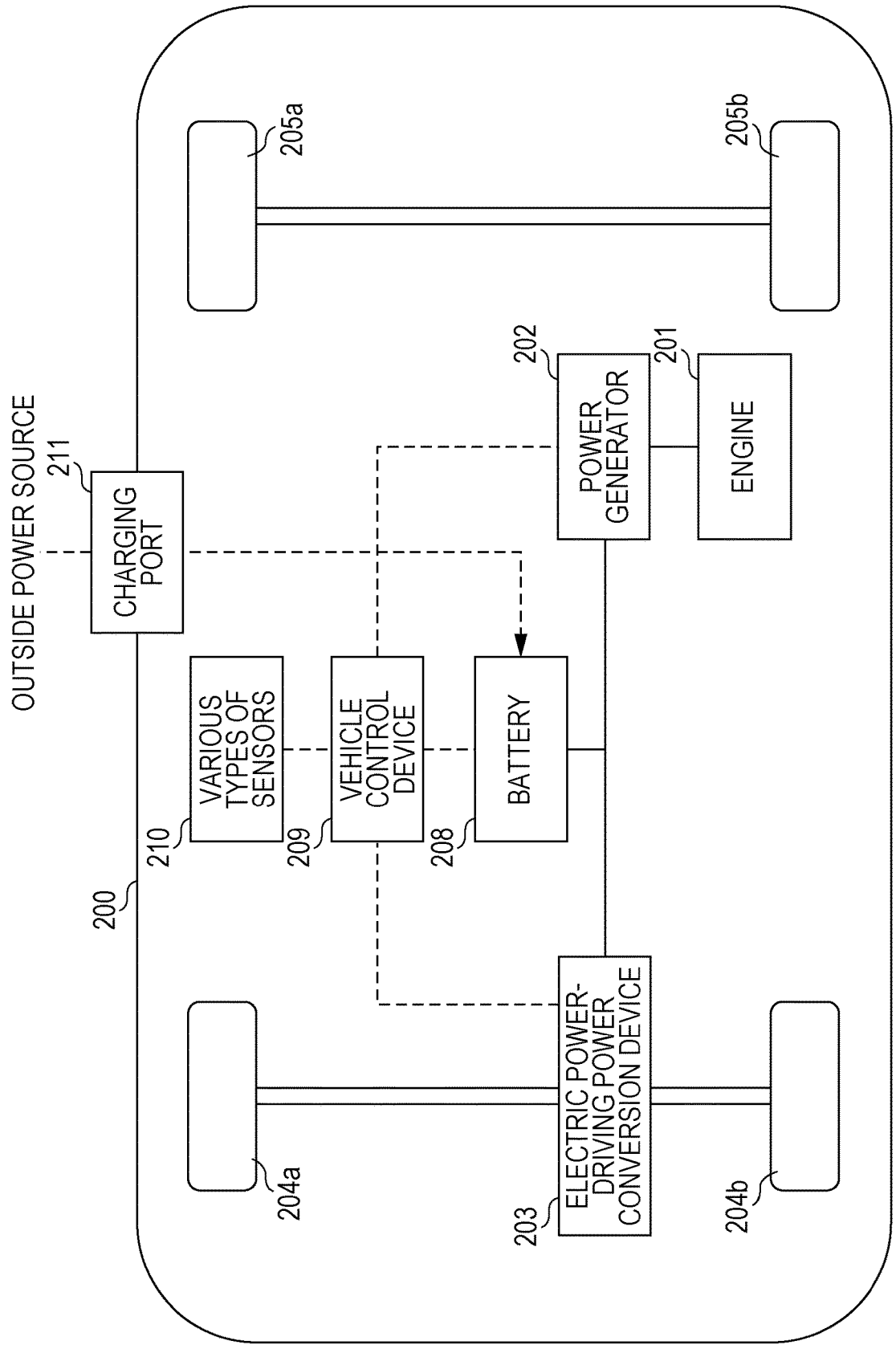
FIG. 22 is a schematic diagram illustrating another application example of the battery pack.

An example in which the embodiment of the present disclosure is applied to a vehicle power storage system is described with reference to FIG. 22. FIG. 22 schematically illustrates an example of the configuration of a hybrid vehicle employing a series hybrid system to which the embodiment of the present disclosure is applied. A vehicle of the series hybrid system is a car which uses power generated by a power generator driven by an engine or uses power once stored in a battery so as to run by an electric power-driving power conversion device.

On this hybrid vehicle 200, an engine 201, a power generator 202, an electric power-driving power conversion device 203, a drive wheel 204*a*, a drive wheel 204*b*, a wheel 205*a*, a wheel 205*b*, a battery 208, a vehicle control device 209, various types of sensors 210, and a charging port 211 are mounted. As the battery 208, the above-described battery unit or battery module of the embodiment of the present disclosure is applied.

The hybrid vehicle 200 is powered by the electric power-driving power conversion device 203 so as to run. An example of the electric power-driving power conversion device 203 is a motor. The electric power-driving power conversion device 203 is operated by power of the battery 208 and rotative force of the electric power-driving power conversion device 203 is transmitted to the drive wheels 204*a* and 204*b*. Here, by using direct current-alternate current conversion (DC-AC conversion) or reverse conversion (AC-DC conversion) on necessary parts, the electric power-driving power conversion device 203 can be applied by an AC motor or a DC motor. The various types of sensors 210 control the engine speed or control opening of a throttle valve (throttle opening) which is not illustrated, via the vehicle control device 209. The various types of sensors 210 include a velocity sensor, an acceleration sensor, an engine speed sensor, and the like.

The rotative force of the engine 201 is transmitted to the power generator 202, and power which is generated by the power generator 202 by the rotative force can be stored in the battery 208.

When the hybrid vehicle is deaccelerated by a braking mechanism which is not depicted, resisting force in the deacceleration is added to the electric power-driving power conversion device 203 as rotative force, and regeneration power generated by the electric power-driving power conversion device 203 by the rotative force is stored in the battery 208.

When the battery 208 is connected with a power source of the outside of the hybrid vehicle, the battery 208 can receive power supply from the outside power source via the charging port 211 serving as an input port and also can store the received power.

Though it is not illustrated, an information processing device which performs information processing on vehicle control based on information about a secondary battery may be provided. As such information processing device, there is an information processing device which performs battery residual capacity display based on information about a battery residual amount, for example.

Thus far, the series hybrid vehicle which uses power generated by a power generator driven by an engine or uses power once stored in a battery so as to run by a motor has been described as an example. However, the embodiment of the present disclosure is applicable to a parallel hybrid vehicle which is powered by outputs of an engine and a motor and arbitrarily switches and uses three systems in which the vehicle runs only by the engine, runs only by the motor, and runs by the engine and the motor. Further, the embodiment of the present disclosure is effectively applicable to a so-called electric vehicle which runs only by a driving motor without using an engine.

[Modification]

The embodiment of the present disclosure has been concretely described thus far, but embodiments of the present disclosure are not limited to the above-described embodiment and various modifications based on the technical idea of the present disclosure may occur. For example, the configuration, the method, the process, the shape, the material, the number, and the like cited in the above-described embodiment are merely an example, and different configuration, method, process, shape, material, number, and the like may be used as necessity.

Further, the configuration, the method, the process, the shape, the material, the number, and the like of the above-described embodiment may be combined with each other within the scope of the embodiment of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery unit, comprising:
   a box-shaped case in which a plurality of secondary batteries are stored, wherein the box-shaped case includes a front face, a back face opposed to the front face, a first lateral face, a second lateral face opposed to the first lateral face, a first main face, and a second main face opposed to the first main face;
   a first heat-transfer face on a first face of one of the first main face or the second main face of the box-shaped case, wherein:
      the first heat-transfer face on the first face is exposed, wherein the first face is an inner surface of the box-shaped case, and
      at least one of the plurality of secondary batteries is fixed to the first heat-transfer face;
   second heat-transfer faces on the first lateral face and the second lateral face, wherein
      the second heat-transfer faces continue up to a position which is slightly below a second face of one of the first main face or the second main face,
      the second face is opposite to the first face, and
      the second heat-transfer faces are continued with the first heat-transfer face;
   an insulating face including portions on at least one of the front face, the back face, one of the first main face or the second main face, or inner faces of the second heat-transfer faces;
   a first holder in a first space of the box-shaped case, wherein the first space is between the front face of the box-shaped case and front faces of the plurality of secondary batteries, wherein:
  each secondary battery of the plurality of secondary batteries is in an outer package member, and
  the plurality of secondary batteries are layered in the box-shaped case;
a second holder in a second space of the box-shaped case, wherein the second space is between the back face of the box-shaped case and back faces of the plurality of secondary batteries;
a first conductive portion configured to connect with a first plurality of positive electrode tabs of the plurality of secondary batteries and a first plurality of negative electrode tabs of the plurality of secondary batteries, wherein the first holder includes the first conductive portion;
a second conductive portion configured to connect with a second plurality of positive electrode tabs of the plurality of secondary batteries and a second plurality of negative electrode tabs of the plurality of secondary batteries, wherein the second holder includes the second conductive portion;
a first connector configured to connect with the first conductive portion, wherein the first connector is in a first concave portion of the first holder;
a second connector configured to connect with the second conductive portion, wherein the second connector is in a second concave portion of the second holder;
a connection line configured to couple the first connector with the second connector, wherein the connection line is on the second main face;
a sleeve holder inserted in at least one of the first holder or the second holder, wherein
  the sleeve holder is fastened to the at least one of the first holder or the second holder by a fastening member that penetrates the sleeve; and
a thermal conductive sheet between two adjacent secondary batteries of the plurality of secondary batteries, wherein
  the thermal conductive sheet is a double-faced adhesive tape.

2. The battery unit according to claim 1, wherein:
a first rectangular slit, in the first holder, is configured to penetrate the first holder in an electrode lead-out direction,
the first conductive portion, is exposed in the first rectangular slit, and
end portions of the first plurality of positive electrode tabs and the first plurality of negative electrode tabs, are inserted from one opening of the first rectangular slit, and are connected with the first conductive portion.

3. The battery unit according to claim 2, wherein
a second rectangular slit is in the second holder,
the second conductive portion, is exposed in the second rectangular slit, and
end portions of the second plurality of positive electrode tabs and the second plurality of negative electrode tabs, are inserted from one opening of the second rectangular slit, and are connected with the second conductive portion.

4. A battery module, comprising:
at least two battery units that are layered and opposed to each other, and have a gap there between, wherein each of the at least two battery units includes:
  a box-shaped case in which a plurality of secondary batteries are stored, wherein the box-shaped case includes a front face, a back face opposed to the front face, a first lateral face, a second lateral face opposed to the first lateral face, a first main face, and a second main face opposed to the first main face;
  a first heat-transfer face on a first face of one of the first main face or the second main face of the box-shaped case, wherein:
    the first heat-transfer face on the first face is exposed, wherein the first face is an inner surface of the box-shaped case, and
    at least one of the plurality of secondary batteries is fixed to the first heat-transfer face;
  second heat-transfer faces on the first lateral face and the second lateral face, wherein
    the second heat-transfer faces continue up to a position which is slightly below a second face of one of the first main face or the second main face,
    the second face is opposite to the first face, and
    the second heat-transfer faces are continued with the first heat-transfer face;
  an insulating face including portions on at least one of the front face, the back face, one of the first main face or the second main face, or inner faces of the second heat-transfer faces;
  a first holder in a first space of the box-shaped case, wherein the first space is between the front face of the box-shaped case and front faces of the plurality of secondary batteries,
  wherein:
    each secondary battery of the plurality of secondary batteries is in an outer package member, and
    the plurality of secondary batteries are layered in the box-shaped case;
  a second holder in a second space of the box-shaped case, wherein the second space is between the back face of the box-shaped case and back faces of the plurality of secondary batteries;
  a first conductive portion configured to connect with a first plurality of positive electrode tabs of the plurality of secondary batteries and a first plurality of negative electrode tabs of the plurality of secondary batteries, wherein the first holder includes the first conductive portion;
  a second conductive portion configured to connect with a second plurality of positive electrode tabs of the plurality of secondary batteries and a second plurality of negative electrode tabs of the plurality of secondary batteries, wherein the second holder includes the second conductive portion;
  a first connector configured to connect with the first conductive portion, wherein the first connector is in a first concave portion of the first holder;
  a second connector configured to connect with the second conductive portion, wherein the second connector is in a second concave portion of the second holder;
  a connection line configured to couple the first connector with the second connector, wherein the connection line is on the second main face; and
  a sleeve holder inserted in at least one of the first holder or the second holder, wherein
    the sleeve holder is fastened to the at least one of the first holder or the second holder by a fastening member that penetrates the sleeve holder, the gap between a first battery unit of the at least two battery units and a second battery unit of the at least two battery units is based on a length of the sleeve holder greater than a thickness of the first battery unit, and the sleeve holder corresponds to the first battery unit.

5. The battery unit according to claim 1, wherein the battery unit is charged by a power generation device configured to generate power from renewable energy.

6. The battery unit according to claim 1, wherein the battery unit is included in a power storage device configured to supply power to an electronic device that is connected with the battery unit.

7. The battery unit according to claim 1, wherein the battery unit is further configured to supply power to an electronic device that is connected to the battery unit.

8. The battery unit according to claim 1, wherein:
the battery unit is further configured to supply electric power to a conversion device in an electric vehicle,
the conversion device is configured to convert the electric power into driving force of the electric vehicle, and
the electric vehicle includes a control device configured to execute information processing about the electric vehicle based on information about the battery unit.

9. The battery unit according to claim 1, wherein one of charge control or discharge control of the battery unit is based on information received from an electronic device, connected to the battery unit, via a network.

10. The battery unit according to claim 1, wherein the battery unit is further configured to receive power from at least one of an electric generation device or a power network.

11. The battery unit according to claim 1, wherein the first conductive portion comprises at least one of nickel or copper.

12. The battery unit according to claim 1, wherein the outer package member comprises a thermal fusion resin layer, a metallic layer and a surface protection layer that are sequentially arranged.

13. The battery unit according to claim 1, wherein the first heat-transfer face is made of aluminum, and each of the second heat-transfer faces has a bilayer structure comprising the insulating face and aluminum.

14. The battery unit according to claim 1, wherein an outer peripheral face of the sleeve holder has a truncated cone shape.

15. The battery module according to claim 4, wherein
the sleeve holder that corresponds to the first battery unit has a first diameter,
a sleeve holder that corresponds to a second battery unit of the at least two battery units has a second diameter, and
the first diameter is larger than the second diameter.

* * * * *